United States Patent
Hirano

(10) Patent No.: US 9,894,248 B2
(45) Date of Patent: Feb. 13, 2018

(54) CONTROL APPARATUS, MULTIDIMENSIONAL COLOR CORRECTION METHOD AND NON-TRANSITORY COMPUTER-READABLE STORAGE MEDIUM STORING MULTIDIMENSIONAL COLOR CORRECTION PROGRAM

(71) Applicant: Konica Minolta, Inc., Chiyoda-ku, Tokyo (JP)

(72) Inventor: Sachiko Hirano, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/396,852

(22) Filed: Jan. 3, 2017

(65) Prior Publication Data
US 2017/0201652 A1  Jul. 13, 2017

(30) Foreign Application Priority Data
Jan. 7, 2016  (JP) ................................. 2016-001597

(51) Int. Cl.
*H04N 1/40* (2006.01)
*H04N 1/60* (2006.01)
*G06K 15/02* (2006.01)
*H04N 1/64* (2006.01)

(52) U.S. Cl.
CPC ....... *H04N 1/6019* (2013.01); *G06K 15/1836* (2013.01); *H04N 1/6005* (2013.01); *H04N 1/6008* (2013.01); *H04N 1/646* (2013.01); *H04N 2201/0094* (2013.01)

(58) Field of Classification Search
CPC .. H04N 1/6019; H04N 1/6005; H04N 1/6008; H04N 1/646; H04N 2201/0094; G06K 15/1836
See application file for complete search history.

(56) References Cited

U.S. PATENT DOCUMENTS

| | | | |
|---|---|---|---|
| 2003/0107772 A1 | 6/2003 | Shimazaki et al. | |
| 2012/0307270 A1* | 12/2012 | Nakajima | H04N 1/56 358/1.9 |
| 2013/0163011 A1* | 6/2013 | Yamaguchi | H04N 1/60 358/1.9 |

FOREIGN PATENT DOCUMENTS

| JP | 2003-136683 A | 5/2003 |
|---|---|---|
| JP | 2013-135362 A | 4/2013 |

* cited by examiner

*Primary Examiner* — Quang N Vo
(74) *Attorney, Agent, or Firm* — Buchanan Ingersoll & Rooney PC

(57) ABSTRACT

A control apparatus includes a control unit, and a raster-image processor that performs color correction to correct colors of a user printing device into colors of a standard printing device by using a multidimensional LUT and performs color conversion by using a printer profile for the standard printing device and a target profile. The control unit creates the multidimensional LUT including a first LUT and a second LUT, and compares chromas of each fully saturated secondary color of the user printing device, the standard printing device and the target colors. On judging that the chroma of one fully saturated secondary color of the user printing device is greater than that of the standard printing device, the control unit instructs the raster-image processor to perform the color correction while specifying use of the first or second LUT according to a comparison result of the chromas.

15 Claims, 14 Drawing Sheets

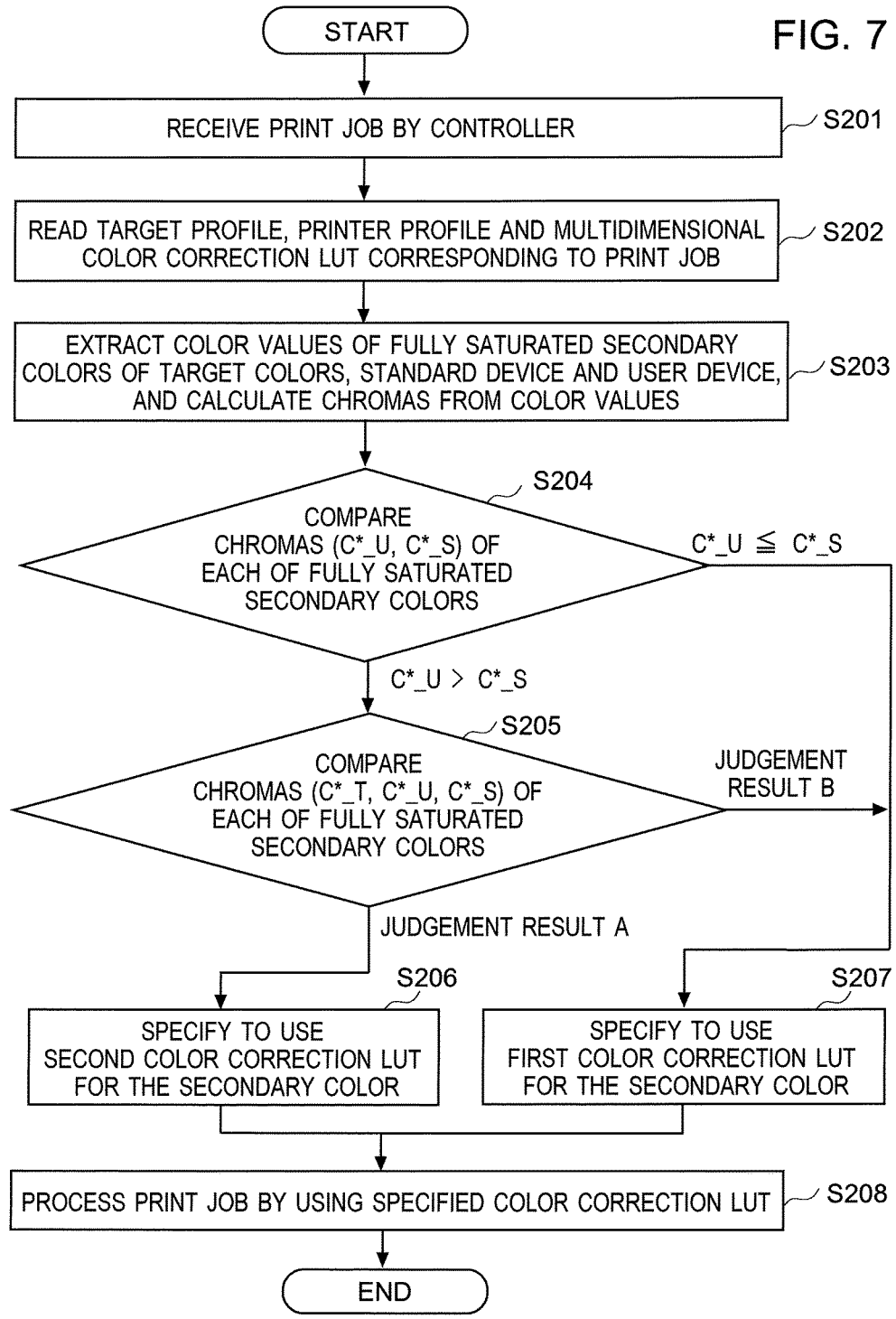

FIG. 8A

| INPUT | | | OUTPUT (WITHOUT REMOVING IMPURITY) | | | OUTPUT (WITH REMOVING IMPURITY) | | | |
|---|---|---|---|---|---|---|---|---|---|
| C | M | Y | C | M | Y | C | M | Y | |
| .. | .. | .. | .. | .. | .. | ▨ | ▨ | ▨ | ⎫ |
| .. | .. | .. | .. | .. | .. | ▨ | ▨ | ▨ | ⎬ COMMON TABLE |
| .. | .. | .. | .. | .. | .. | ▨ | ▨ | ▨ | ⎭ |
| 0 | 10 | 10 | 0 | 11 | 9 | 0 | 11 | 9 | ⎫ |
| 0 | 20 | 20 | 0 | 23 | 20 | 0 | 23 | 20 | ⎪ |
| .. | .. | .. | .. | .. | .. | .. | .. | .. | ⎬ R TABLE |
| 0 | 90 | 90 | 1 | 86 | 87 | 0 | 86 | 88 | ⎪ |
| 0 | 100 | 100 | 3 | 94 | 95 | 0 | 95 | 97 | ⎭ |
| .. | .. | .. | .. | .. | .. | .. | .. | .. | ⎱ G TABLE |
| .. | .. | .. | .. | .. | .. | .. | .. | .. | ⎰ |
| .. | .. | .. | .. | .. | .. | .. | .. | .. | ⎱ B TABLE |
| .. | .. | .. | .. | .. | .. | .. | .. | .. | ⎰ |

FIG. 8B
RELATED ART

| C | M | Y | C | M | Y |
|---|---|---|---|---|---|
| : | : | : | : | : | : |
| : | : | : | : | : | : |
| : | : | : | : | : | : |
| 0 | 10 | 10 | 0 | 11 | 9 |
| 0 | 20 | 20 | 0 | 23 | 20 |
| : | : | : | : | : | : |
| 0 | 90 | 90 | 1 | 86 | 87 |
| 0 | 100 | 100 | 3 | 94 | 95 |
| : | : | : | : | : | : |
| : | : | : | : | : | : |
| : | : | : | : | : | : |
| : | : | : | : | : | : |

6×6×6 COLOR PATCHES FOR CREATING 3-DIMENSIONAL COLOR CORRECTION LUT

| INPUT | | | OUTPUT | | |
|---|---|---|---|---|---|
| C | M | Y | C | M | Y |
| 0 | 0 | 0 | 0 | 0 | 0 |
| : | : | : | : | : | : |
| 0 | 10 | 10 | 0 | 11 | 9 |
| 0 | 20 | 20 | 0 | 23 | 20 |
| : | : | : | : | : | : |
| 0 | 90 | 90 | 1 | 86 | 87 |
| 0 | 100 | 100 | 3 | 94 | 95 |
| : | : | : | : | : | : |
| 100 | 100 | 100 | 100 | 99 | 97 |

CONTROL APPARATUS, MULTIDIMENSIONAL COLOR CORRECTION METHOD AND NON-TRANSITORY COMPUTER-READABLE STORAGE MEDIUM STORING MULTIDIMENSIONAL COLOR CORRECTION PROGRAM

The entire disclosure of Japanese Patent Application No. 2016-001597 filed on Jan. 7, 2016 including description, claims, drawings, and abstract are incorporated herein by reference in its entirety.

TECHNICAL FIELD

The present invention is directed to control apparatuses, multidimensional color correction methods and non-transitory computer-readable storage media each storing a multidimensional color correction program. In particular, the present invention is directed to a control apparatus that performs color correction by using a LUT (look-up table) including multidimensional data sets of plural color components, a multidimensional color correction method for use in a printing system including the control apparatus, and a non-transitory computer-readable storage medium storing a multidimensional color correction program to be executed in the control apparatus.

BACKGROUND

In recent years, color reproduction accuracy is considered as one of important matters to maintain the quality of printed matters. The color reproduction accuracy is evaluated by using a color difference (for example, ΔE) between color values (for example, L*a*b* values) and colors defined according to standards in the printing industry (such as FOGRA in Europe, GRACoL in US, and Japan Color in Japan), and such standards each defines a tolerance of the color difference. To achieve an allowable color reproduction accuracy, color conversion is generally performed by using ICC (International Color Consortium) profiles including a target profile and a printer profile.

DESCRIPTION OF THE RELATED ART

To make the ICC profiles work properly, there is a need to match characteristics of a printer with a printer profile, and a printer profile should be essentially created for each individual printer. However, creation of printer profiles takes a lot of effort and knowledge, and manufacturers provide standard profiles each prepared on the assumption of the median of individual differences in characteristics of printers, and many users use the standard profiles provided. Herein, a printer having the median characteristics is referred to as a standard printing device or a standard device.

A result of color conversion by using a standard profile, still includes color difference due to the individual differences in characteristics of printers. To solve the color difference, recent printers are equipped with a multidimensional color correction function (for example, please see JP-A No. 2013-135362 which corresponding to US2013/0163011A1). The multidimensional color correction function is a function to correct the color reproducibility of individual printers (user printing devices) by using a three-dimensional color correction LUT, so as to match the color reproducibility of the individual printers with the color reproducibility of the standard printing device. This technique makes the color reproducibility of the individual printers after color correction, equivalent to that of the standard printing device, and therefore, realizes enhanced color reproducibility of the individual printers even if color conversion was performed by using the standard profile.

To match colors of a printer with target colors, a specific process, which is referred to as a process of removing impurity of secondary colors or preserving purity of secondary colors, can be used. The process is to preserve values of complementary color components of secondary colors before and after color conversion (for example, please see JP-A No. 2003-136683 which corresponding to US2003/0107772A1).

Employing the above-described multidimensional color correction can match the color reproducibility of individual printers (user printing devices) with that of the standard printing device. However, under a condition that the color gamut of a user printing device is wider than the color gamut of the standard printing device and the color gamut of target colors is wider than the color gamut of the standard printing device, such the multidimensional color correction can invalidate a part of the original color gamut of the user printing device, which was outside the color gamut of the standard printing device. It makes the color difference between color values obtained after the multidimensional color correction and color values of the target colors greater (worse) in comparison with the color difference coming from the capability of the user printing device.

To solve the above-described issue, it is necessary to abandon a LUT to be used for the multidimensional color correction and then create a dedicated printer profile for a user printing device. However, this technique needs user's effort and knowledge to create a printer profile for the user printing device and further needs thoroughgoing irregular operations of color reproduction, which includes a process to establish settings of color conversion so as to convert color values of the user printing device into target color values properly and a use of a printer profile for the user printing device without using the multidimensional color correction.

SUMMARY

The present invention is directed to control apparatuses, multidimensional color correction methods and non-transitory computer-readable storage media each storing a multidimensional color correction program, which allow to properly perform multidimensional color correction according to the sizes of the color gamut of a user printing device, the color gamut of a standard printing device and the color gamut of target colors.

A control creation apparatus reflecting one aspect of the present invention is a control apparatus for controlling a user printing device. The user printing device is equipped with a print engine that forms images by using at least three primary colors which are different in hue from each other. The control apparatus comprises a raster-image processor and a control unit that controls the raster-image processor. The raster-image processor performs multidimensional color correction and color conversion on image data created from a print job. The multidimensional color correction is a process to correct colors to be output by the user printing device into colors to be output by a predetermined standard printing device, by using a multidimensional LUT (look-up table) which associates input color values of three or more primary colors with corresponding output color values. The color conversion is a process to convert colors to be output by the standard printing device into target colors, by using a printer profile for the standard printing device and a target profile. The control unit includes a table creation section and a correction control section. The table creation section creates the multidimensional LUT including a first LUT and a second LUT. The first LUT includes output color values which are indexed by the input color values and are to be obtained by the multidimensional color correction performed on the input color values without a specific process. The specific process is a process to preserve values of complementary color components of secondary colors before and after the multidimensional color correction. The second LUT including output color values which are indexed by the input color values and are to be obtained by the multidimensional color correction performed on the input color values with the specific process. The correction control section obtains color values of fully saturated secondary colors of the user printing device, the standard printing device and the target colors, by referring to the multidimensional LUT, the printer profile for the standard printing device and the target profile. The correction control section calculates chromas of the fully saturated secondary colors of the user printing device, the standard printing device and the target colors from the color values obtained, to compare the chromas with each other for each of the fully saturated secondary colors. On judging that the chroma of one of the fully saturated secondary colors of the user printing device is greater than the chroma of the one of the fully saturated secondary colors of the standard printing device, the correction control section gives the raster-image processor an instruction to perform the multidimensional color correction while specifying use of the first LUT or the second LUT on the basis of the chromas of the one of the fully saturated secondary colors, as follows. The correction control section instructs the raster-image processor to perform the multidimensional color correction while specifying use of the second LUT, on judging that the chroma of the one of the fully saturated secondary colors of the target colors is greater than the chroma of the one of the fully saturated secondary colors of the user printing device; and instructs the raster-image processor to perform the multidimensional color correction while specifying use of the first LUT, on judging that the chroma of the one of the fully saturated secondary colors of the target colors is smaller than the chroma of the one of the fully saturated secondary colors of the standard printing device. The correction control section further outputs print image data on which the raster-image processor performed the multidimensional color correction and the color conversion, to the print engine and gives the print engine a print instruction.

A multidimensional color correction method reflecting one aspect of the present invention is a method for use in a printing system including a user printing device and a control apparatus which controls the user printing device. The user printing device includes a print engine that forms images by using at least three primary colors which are different in hue from each other. The control apparatus includes a raster-image processor that performs multidimensional color correction and color conversion on image data created from a print job. The multidimensional color correction is a process to correct colors to be output by the user printing device into colors to be output by a predetermined standard printing device, by using a multidimensional LUT (look-up table) which associates input color values of three or more primary colors with corresponding output color values. The color conversion is a process to convert colors to be output by the standard printing device into target colors, by using a printer profile for the standard printing device and a target profile. The multidimensional color correction method comprises creating the multidimensional LUT including a first LUT and a second LUT. The first LUT includes output color values which are indexed by the input color values and are to be obtained by the multidimensional color correction performed on the input color values without a specific process. The specific process is a process to preserve values of complementary color components of secondary colors before and after the multidimensional color correction. The second LUT includes output color values which are indexed by the input color values and are to be obtained by the multidimensional color correction performed on the input color values with the specific process. The multidimensional color correction method further comprises obtaining color values of fully saturated secondary colors of the user printing device, the standard printing device and the target colors, by referring to the multidimensional LUT, the printer profile for the standard printing device and the target profile. The multidimensional color correction method further comprises calculating chromas of the fully saturated secondary colors of the user printing device, the standard printing device and the target colors from the color values obtained, to compare the chromas with each other for each of the fully saturated secondary colors. The multidimensional color correction method further comprises, on judging that the chroma of one of the fully saturated secondary colors of the user printing device is greater than the chroma of the one of the fully saturated secondary colors of the standard printing device, giving the raster-image processor an instruction to perform the multidimensional color correction while specifying use of the first LUT or the second LUT on the basis of the chromas of the one of the fully saturated secondary colors. The giving the raster-image processor to the instruction on the basis of the chromas, includes instructing the raster-image processor to perform the multidimensional color correction while specifying use of the second LUT, on judging that the chroma of the one of the fully saturated secondary colors of the target colors is greater than the chroma of the one of the fully saturated secondary colors of the user printing device, and instructing the raster-image processor to perform the multidimensional color correction while specifying use of the first LUT, on judging that the chroma of the one of the fully saturated secondary colors of the target colors is smaller than the chroma of the one of the fully saturated secondary colors of the standard printing device. The multidimensional color correction method further comprises outputting print image data on which the raster-image processor performed the multidimensional color correction and the color conversion, to the print engine and giving the print engine a print instruction.

A non-transitory computer-readable storage medium reflecting one aspect of the present invention stores a multidimensional color correction program to be executed in a control apparatus for controlling a user printing device. The user printing device is equipped with a print engine that forms images by using at least three primary colors which are different in hue from each other. The control apparatus comprises a control unit and a raster-image processor that performs multidimensional color correction and color conversion on image data created from a print job. The multidimensional color correction is a process to correct colors to be output by the user printing device into colors to be output by a predetermined standard printing device, by using a multidimensional LUT (look-up table) which associates input color values of three or more primary colors with corresponding output color values. The color conversion is a process to convert colors to be output by the standard printing device into target colors by using a printer profile for the standard printing device and a target profile. The multidimensional color correction program, when being executed, causes the control unit of the control apparatus to carry out the above-described multidimensional color correction method.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 7 is a flowchart illustrating an example of the operation (print processing of a job) of the controller according to one embodiment of the present invention;

FIGS. 8A and 8B are a table illustrating an example of a multidimensional color correction LUT according to one embodiment of the present invention, and a table illustrating an example of a conventional multidimensional color correction LUT;

DESCRIPTION OF THE PREFERRED EMBODIMENTS

Figure 1:
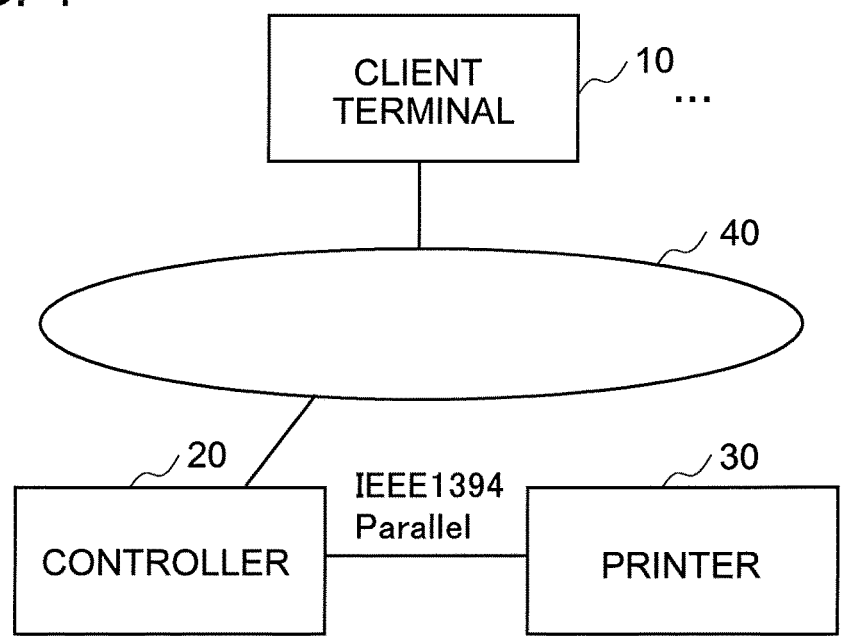
FIG. 1 is a schematic diagram illustrating an example of the structure of a printing system according to one embodiment of the present invention.

Hereinafter, an embodiment of the present invention will be described with reference to the drawings. However, the scope of the invention is not limited to the illustrated examples.

Control apparatuses, multidimensional color correction methods and non-transitory computer-readable storage media each storing a multidimensional color correction program as embodiments of the present invention, allow to properly perform multidimensional color correction according to the sizes of the color gamut of a user printing device, the color gamut of a standard printing device and the color gamut of target colors.

That is because a control apparatus, which controls a print engine of a user printing device, includes a raster-image processor and a control unit that controls the raster-image processor and performs the following processing (when executing a multidimensional color correction program). The raster-image processor performs multidimensional color correction to correct color values to be output by a user printing device into color values to be output by a standard printing device, by using a multidimensional color correction LUT, where the multidimensional color correction LUT is a three or more dimensional LUT for color correction. The raster-image processor further performs color conversion to convert color values to be output by the standard printing device into color values of target colors. The control unit of the control apparatus creates the multidimensional color correction LUT including a first LUT (a first color correction LUT) and a second LUT (a second color correction LUT). The first correction LUT includes sets of output color values which can be indexed by set of input color values and are to be obtained by the multidimensional color correction performed on the set of input color values without a specific process. The second correction LUT includes sets of output color values which can be indexed by set of input color values and are to be obtained by the multidimensional color correction performed on the set of input color values with the specific process. The control unit compares chromas of each fully saturated secondary color of the user printing device, the standard printing device and the target colors, which are calculated from color values of the fully saturated secondary colors of the user printing device, the standard printing device and the target colors. When judging that the chroma of one of the fully saturated secondary colors of the user printing device is greater than that of the standard printing device, the control unit instructs the raster-image processor to perform the multidimensional color correction according to a result of comparison of the chromas. That is, the control unit instructs the raster-image processor to perform the multidimensional color correction while specifying use of the second color correction LUT, if the chroma of the fully saturated secondary color of the target colors is greater than that of the user printing device, and to perform the multidimensional color correction with specifying use of the first color correction LUT, if the chroma of the fully saturated secondary color of the target colors is smaller than that of the standard printing device. The control unit then outputs print image data on which the raster-image processor performed the multidimensional color correction and the color conversion, to the print engine and gives the print engine a print instruction.

Figures 11A, 11B:
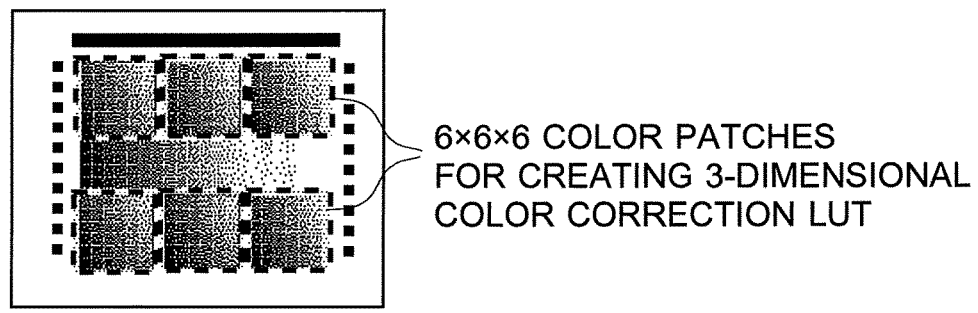
FIGS. 11A and 11B are diagrams illustrating a conventional procedure of creating a multidimensional color correction LUT.
Figure 12:
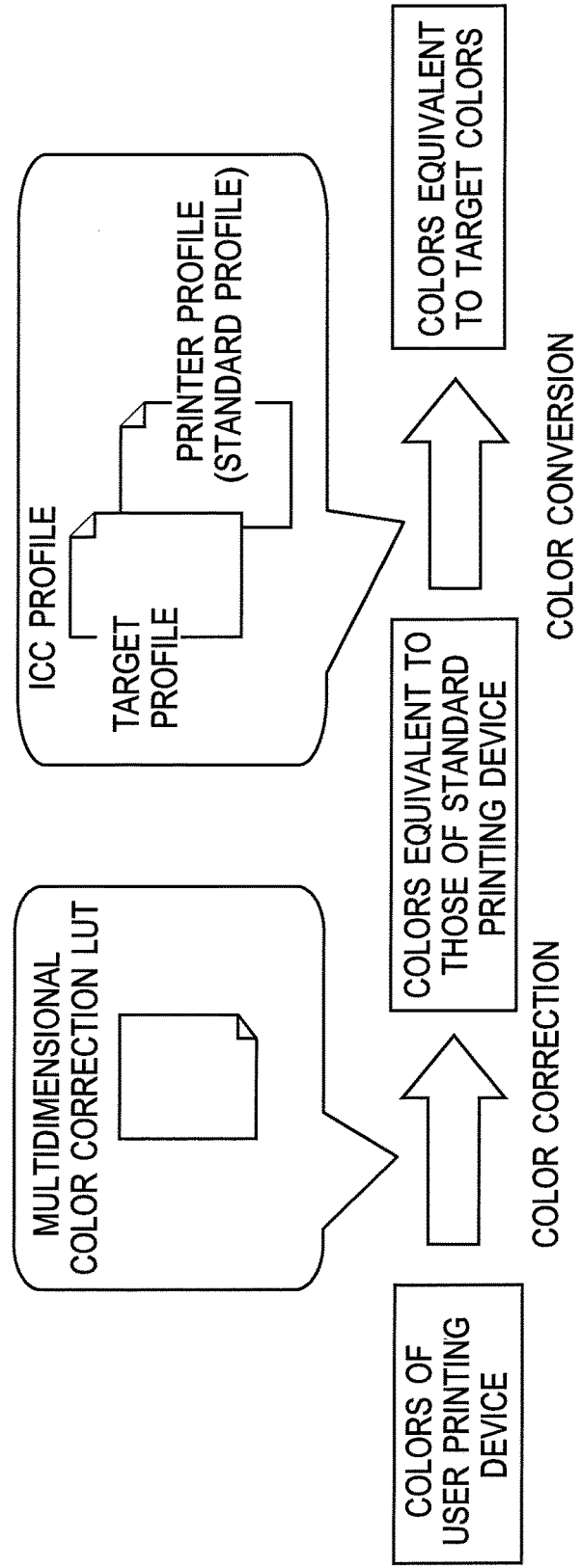
FIG. 12 is a diagram schematically illustrating processing to be performed when a print job is printed.

As described in BACKGROUND, there has been proposed multidimensional color correction as a function to solve the color difference which can arise due to the individual differences in characteristics of printers when in a printing system including plural printers color conversion is performed by using a standard profile. To perform the multidimensional color correction, a printer (a user printing device) prints out a measurement chart and obtains measured color values of color patches of the chart, where the measurement chart includes, as illustrated in FIG. 11A, an array of color patches (for example, 6×6×6 patches) the number of which is smaller than the number of color patches of a color chart for creating a printer profile. By associating sets of input color values with corresponding sets of output color values, a three-dimensional color correction LUT is created. For example, as illustrated in FIG. 11B, the three-dimensional color correction LUT includes output CMY values that can be indexed by input CMY values. Then, as illustrated in FIG. 12, when printing a print job, colors to be output by a user printing device (hereinafter, referred to as colors of the user printing device) is corrected into colors to be output by a standard printing device (hereinafter, referred to as colors of a standard printing device) by using a multidimensional color correction LUT (in this example, the three-dimensional color correction LUT), and colors equivalent to those of the standard printing device are obtained. Then, the resulting colors are converted into colors equivalent to target colors by using a target profile and a printer profile (in this example, a standard profile).

By employing the multidimensional color correction, it is possible to make color reproducibility of a user printing device equivalent to that of a standard printing device. However, under the condition that the color gamut of a user printing device is wider than the color gamut of a standard printing device and the color gamut of target colors is wider than the color gamut of the standard printing device, such the multidimensional color correction can invalidate a part of the original color gamut of the user printing device, which was outside the color gamut of the standard printing device. In other words, the multidimensional color correction can make an area of colors that can be output by the user printing device but are unavailable in the color gamut of the user printing device.

Figure 13A:
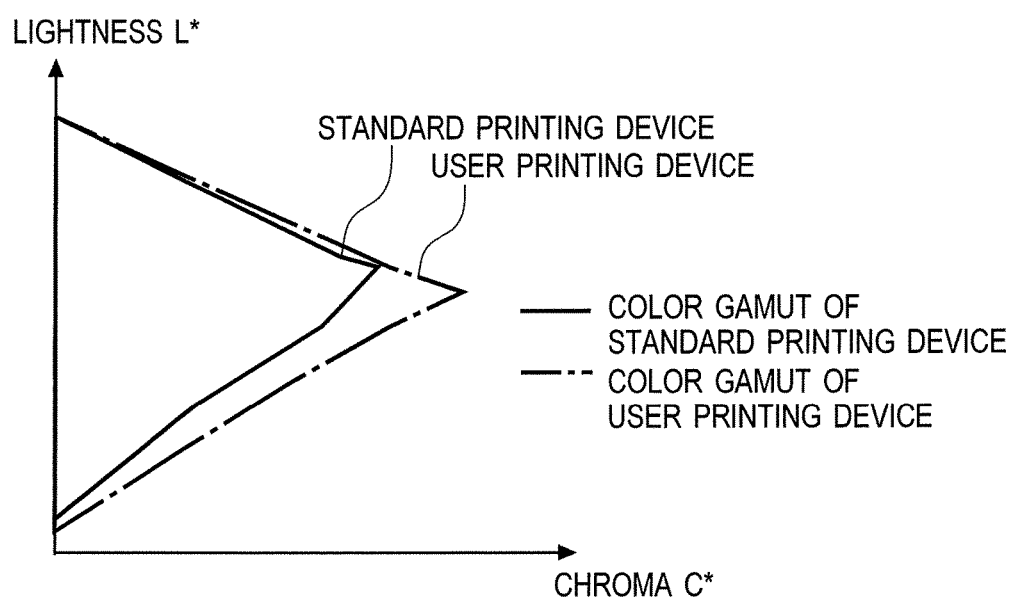
FIGS. 13A and 13B are diagrams illustrating an issue which can arise when a multidimensional color correction function is used.
Figure 13B:
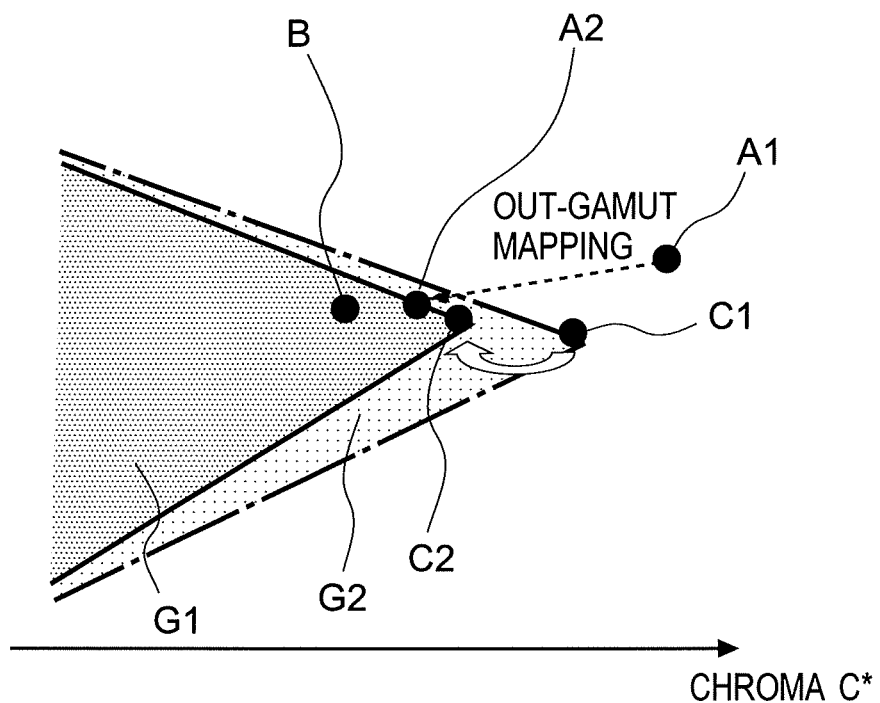

A description is given of this matter with reference to FIGS. 13A and 13B. FIG. 13A is a chromaticity diagram (in this example, a schematic chroma-lightness view taken at red) for illustrating color gamuts of a user printing device and a standard printing device, where the transverse axis and the vertical axis of the diagram represent chroma (C*) and lightness (L*), respectively. FIG. 13B is an enlarged diagram of an area around the peak of chroma of each of the color gamut of the user printing device and the color gamut of the standard printing device of FIG. 13A. In the diagrams, the color gamut of the standard printing device (gamut of colors written in the standard profile) is represented by a thick solid line, and the color gamut of the user printing device (gamut of colors written in the three-dimensional color correction LUT) is represented by a thick one-dot chain line.

FIG. 13B shows the point A1 indicating a color of color conversion target, which is out of the color gamut of the standard printing device. Since the standard printing device cannot represent the color indicated by the point A1, the color is mapped on the basis of a A2B table (AtoB tags) in the standard profile to a color that exists in the color gamut of the standard printing device (by using out-of-gamut mapping). It defines the color indicated by the point A2 in FIG. 13B as the destination color of the profile color conversion performed on the color indicated by the point A1. FIG. 13B further shows the point B indicating a color of color conversion target, which is within the color gamut of the standard printing device. Since the standard printing device can represent the color indicated by the point B, the color indicated by the point B is used as the destination color of the profile color conversion, which performed on the color indicated by the point B. FIG. 13B further shows the point C1 indicating a color within the color gamut of the user printing device. The color indicated by the point C1 is corrected to the color indicated by the point C2 within the color gamut of the standard printing device, by using the multidimensional color correction LUT. When a user printing device prints a job as described above, colors of the user printing device is corrected by using the multidimensional color correction color LUT and colors equivalent to those of the standard printing device are obtained. After that, the resulting colors are converted into colors equivalent to target colors. By performing this processing, color values of the color conversion target within the color gamut of the standard printing device (please see area G1 in FIG. 13B) are converted with accuracy, because such the color values of the color conversion target match the destination color values. On the other hand, colors values of the color conversion target, which are out of the color gamut of the standard printing device, are converted with inaccuracy, because such the color values do not match the destination color values. In particular, the area G2 in FIG. 13B, which is outside the color gamut of the standard printing device becomes an area of colors that can be output by the user printing device but are unavailable in the color gamut of the user printing device.

It can be considered to use the following color correction technique in the above-described processing. The technique is one of popular techniques used for one-dimensional color correction, and obtains destination color values of intermediate colors by calculating their relative values to density values or color values of white and the fully saturated color by using a mathematical formula. Since this technique does not correct fully saturated colors, the above-described processing, in which this technique is used, does not make an area of colors that can be output by the user printing device but are unavailable in the color gamut of the user printing device, but deteriorates the accuracy of color conversion using an ICC profile. Further, a process to remove impurity of secondary colors, which preserves values of complementary color components of secondary colors before and after color conversion, can generally solve deterioration of color reproducibility which comes from change of values of the complementary color components due to color conversion. However, executing the process of removing impurity of secondary colors may worsen the color reproducibility of target colors within the color gamut of the standard printing device. Further, the color gamuts of printers are affected by paper type, and the color gamut of one user printing device may sometimes become greater than that of the standard printing device because of paper to be used for printing, even if there is no individual differences in characteristics of the printers.

To solve the above-described issues, it may be considered to abandon a LUT to be used for the multidimensional color correction and then create a dedicated printer profile for a user printing device. However, this technique needs user's effort and knowledge to create a printer profile for the user printing device and further needs irregular operations of color reproduction. From such a background, there is a demand to propose a multidimensional color correction method which allows to properly perform a multidimensional color correction according to the sizes of the color gamut of a user printing device, the color gamut of a standard printing device and the color gamut of target colors.

In view of that, an embodiment of the present invention provides a control apparatus configured to perform the following processing. The control apparatus creates a LUT to be used for the multidimensional color correction, including two kinds of LUT in advance: the first is a LUT (first LUT) including sets of output color values to be obtained by the multidimensional color correction performed without (with turning off) a specific process (a process of removing impurity of secondary colors); and the second is a LUT (second LUT) including sets of output color values to be obtained by the multidimensional color correction performed with (with turning on) the specific process (the process of removing impurity of secondary colors). The control apparatus judges, on the basis of only color values of fully saturated secondary colors of the target colors, the standard printing device and the user printing device, whether the color gamut of a user printing device is greater than that of a standard printing device and the color gamut of target colors is greater than that of the color gamut of the user printing device, or whether the color gamut of a user printing device is greater than that of a standard printing device and the color gamut of target colors is smaller than that of the color gamut of the standard printing device. When judging that the color gamut of target colors is greater than that of the color gamut of the user printing device in this judgement, the control apparatus performs the multidimensional color correction by using the second LUT. When judging that the color gamut of target colors is smaller than that of the color gamut of the standard printing device in this judgement, the control apparatus perforin the multidimensional color correction by using the first LUT.

In concrete terms, the control apparatus for controlling a user printing device equipped with a print engine is configured to perform the following processing. The control apparatus includes a raster-image processor and a control unit that controls the raster-image processor. The raster-image processor performs multidimensional color correction and color conversion on image data created from a print job. The multidimensional color correction is a process to correct colors to be output by the user printing device into colors to be output by a predetermined standard printing device, by using a multidimensional LUT which associates sets of input color values of three or more primary colors with corresponding sets of output color values. The color conversion is a process to convert colors to be output by the standard printing device into target colors, by using a printer profile for the standard printing device and a target profile. The control unit of the control apparatus is configured to perform the following processing. That is, the control unit creates a multidimensional LUT including a first LUT and a second LUT. The first LUT includes sets of output color values which are indexed by the set of input color values and are to be obtained by the multidimensional color correction performed on the set of input color values without a specific process, where the specific process is a process to preserve values of complementary color components of secondary colors (each made by mixing two of the three or more primary colors) before and after the multidimensional color correction. The second LUT includes sets of output color values which are indexed by the set of input color values and are to be obtained by the multidimensional color correction performed on the set of input color values with the specific process. Then, the control unit compares chromas of each fully saturated secondary color of the user printing device, the standard printing device and the target colors, which are calculated on the basis of the multidimensional LUT created, a printer profile for the standard printing device and a target profile. When judging that the chroma of one of the fully saturated secondary colors of the user printing device is greater than that of the standard printing device, the control unit instructs the raster-image processor to perform the multidimensional color correction while specifying use of the second LUT, for the fully saturated secondary color such that the chroma of the fully saturated secondary color of the target colors is greater than the chroma of the fully saturated secondary color of the user printing device, and instructs the raster-image processor to perform the multidimensional color correction with specifying use of the first LUT, for the fully saturated secondary color such that the chroma of the fully saturated secondary color of the target colors is smaller than the chroma of the fully saturated secondary color of the standard printing device. Then, the control apparatus outputs print image data on which the raster-image processor performed the multidimensional color correction and the color conversion, to the print engine and gives the print engine a print instruction.

As described above, in the embodiment of the present invention, a use or nonuse (on/off) of the process of removing impurity of secondary colors in the multidimensional color correction can be switched according to a comparison result of color values or chromas of each fully saturated secondary colors of the target colors, the user printing device and the standard printing device. Therefore, in comparison with the multidimensional color correction in which a use or nonuse of the process of removing the impurity of secondary colors is consistently specified, the multidimensional color correction of an embodiment of the present invention can provide enhanced accuracy of printer's color reproducibility, even if color conversion is performed by using a standard profile. This multidimensional color correction works separately from color conversion using profiles and therefore does not need to prepare a multidimensional correction LUT for each of various color conversion targets.

EXAMPLES

Figure 2:
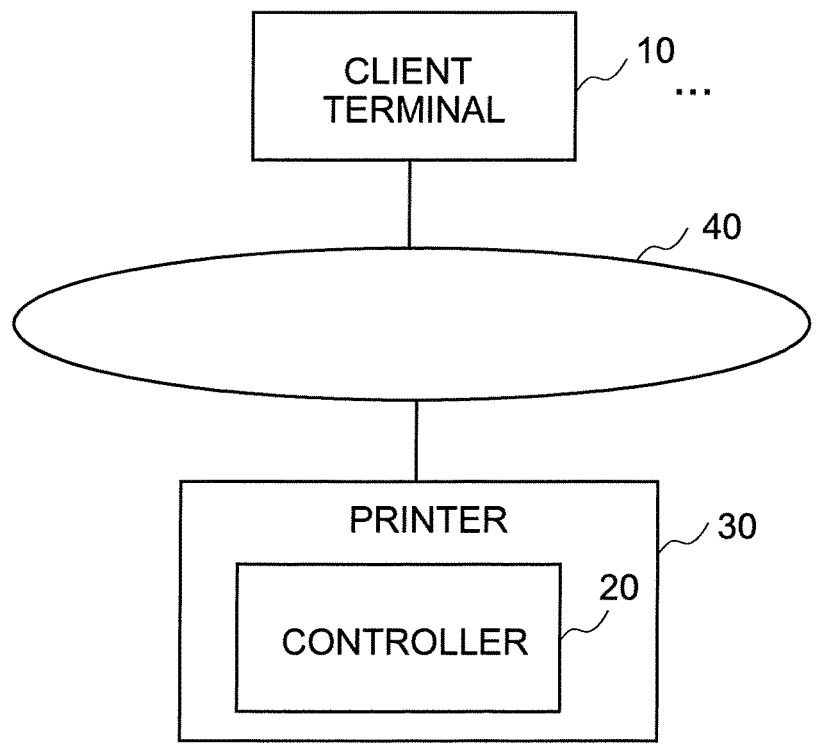
FIG. 2 is a schematic diagram illustrating another example of the structure of a printing system according to one embodiment of the present invention.
Figure 4A:
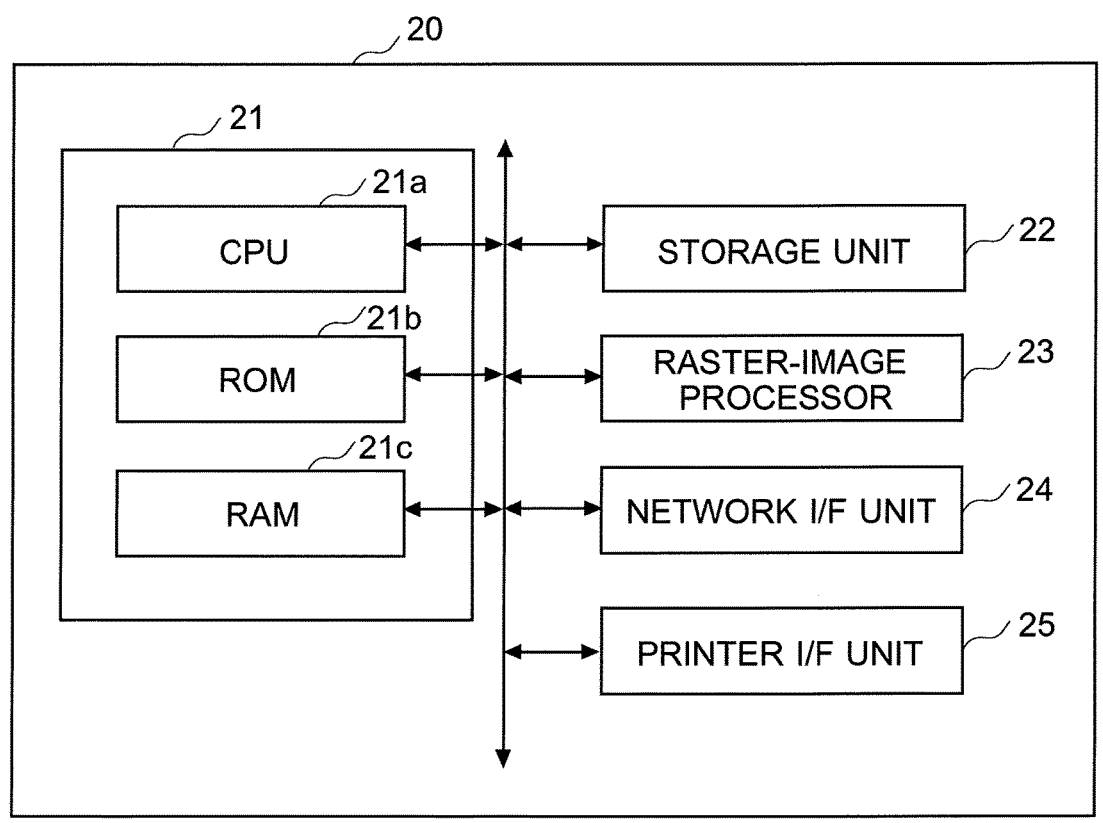
FIGS. 4A and 4B are block diagrams illustrating an example of the structure of a controller according to one embodiment of the present invention.
Figure 4B:
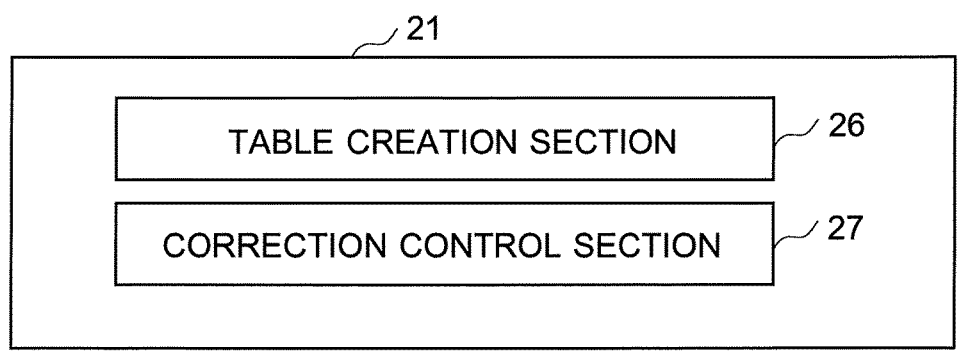
Figure 5:
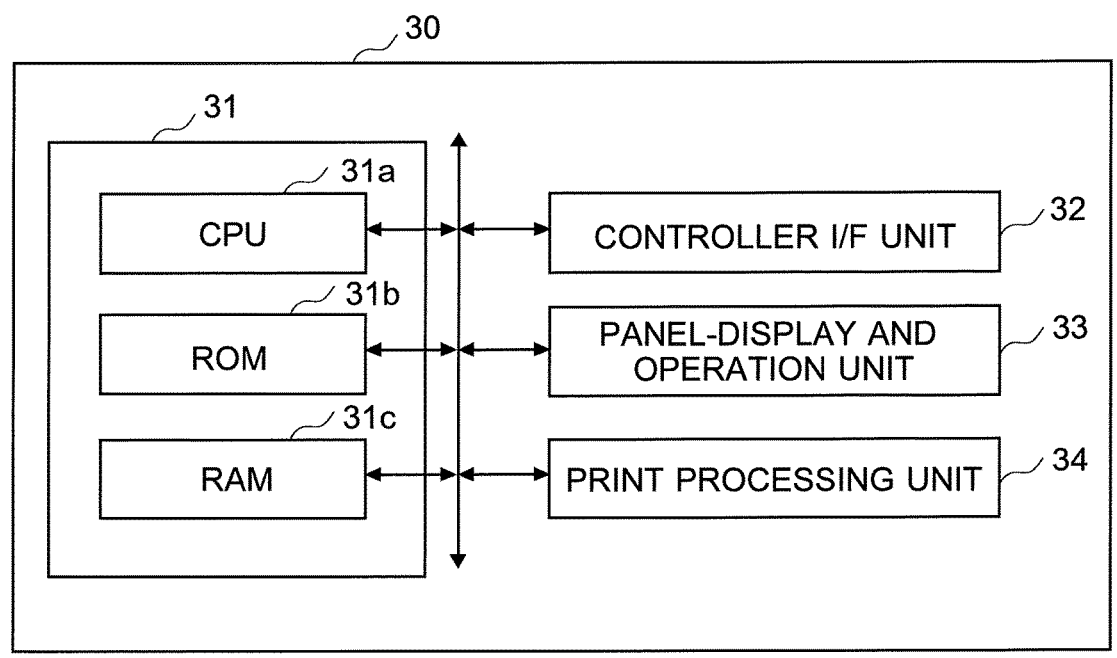
FIG. 5 is a block diagram illustrating an example of the structure of a printer according to one embodiment of the present invention.
Figure 6:
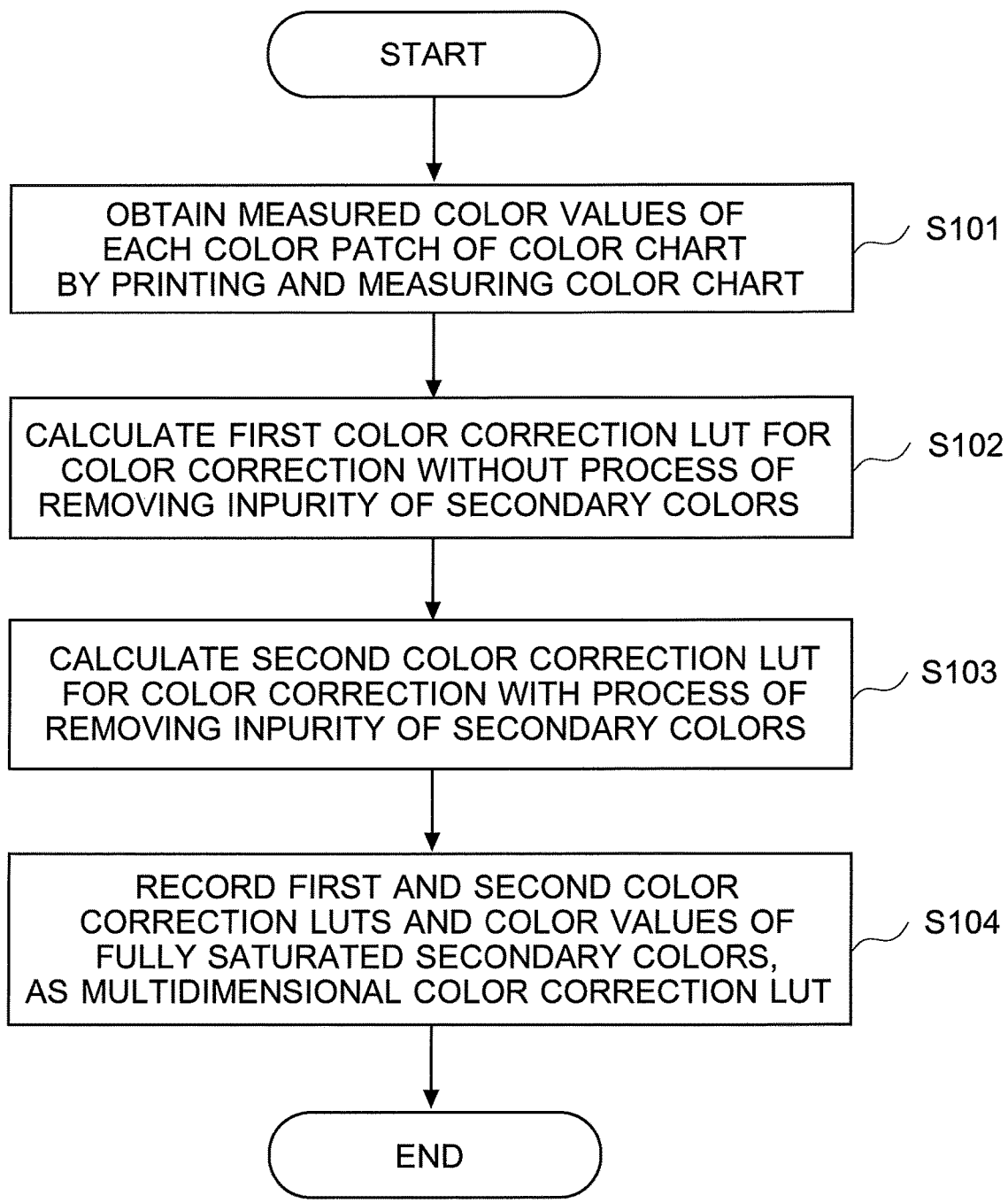
FIG. 6 is a flowchart illustrating an example of the operation (creation of a multidimensional color correction LUT) of the controller according to one embodiment of the present invention.
Figure 9:
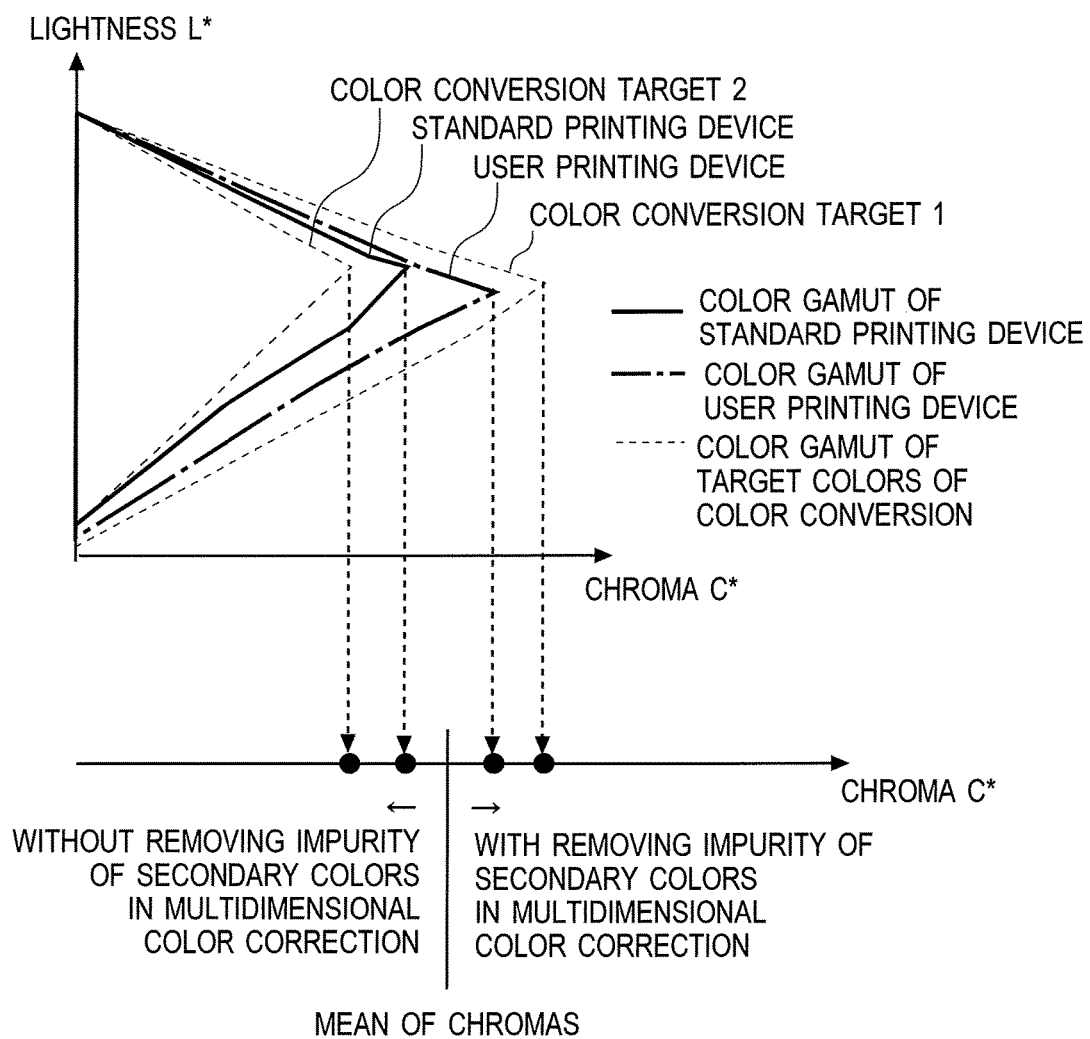
FIG. 9 is a diagram illustrating an example of a judgement whether to turn on or off a process of removing impurity of secondary colors according to one embodiment of the present invention.
Figure 10:
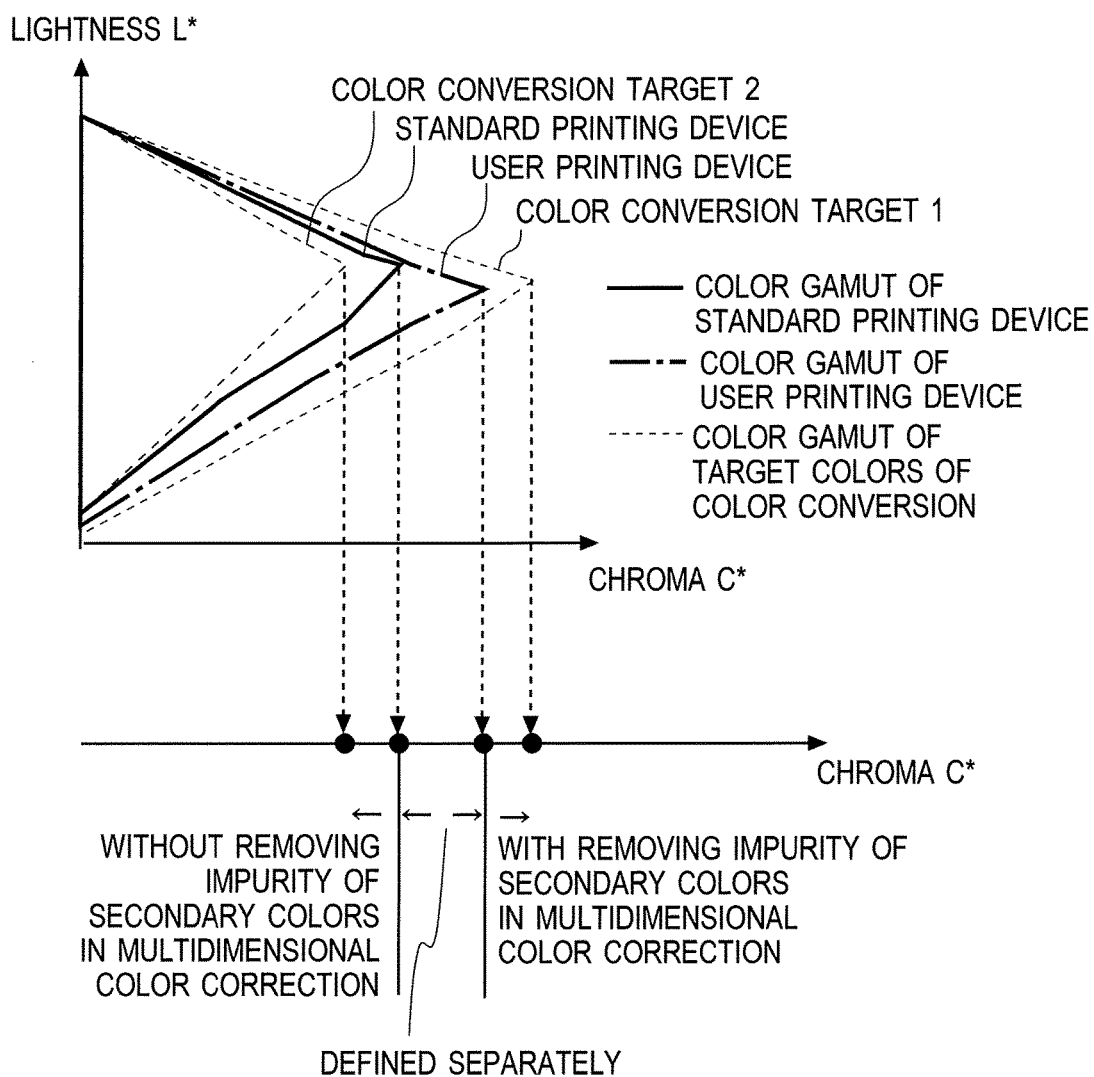
FIG. 10 is a diagram illustrating another example of a judgement whether to turn on or off the process of removing impurity of secondary colors according to one embodiment of the present invention.

In order to describe the above-mentioned embodiments of the present invention in more detail, a description is given to a control apparatus, a multidimensional color correction method and a non-transitory computer-readable storage medium storing a multidimensional color correction program according to one example of the present invention with reference to FIG. 1 to FIG. 10. Each of FIG. 1 and FIG. 2 is a schematic diagram illustrating an example of the structure of a printing system of the present example. FIGS. 3A and 3B, FIGS. 4A and 4B and FIG. 5 are block diagrams illustrating an example of the structure of a client terminal, an example of the structure of a controller, and an example of the structure of a printer of the present example. Each of FIG. 6 and FIG. 7 is a flowchart illustrating an example of the operation of the controller of the present example. FIGS. 8A and 8B are a table illustrating an example of the multidimensional color correction LUT of the present example and a table illustrating an example of a conventional multidimensional color correction LUT. Each of FIG. 9 and FIG. 10 is a diagram illustrating an example of a judgement whether to turn on or off (whether or not to use) the process of removing impurity of secondary colors of the present example.

As illustrated in FIG. 1, a printing system of the present example includes at least one client terminal 10, controller 20, printer 30 which are located on an intranet to be communicably connected with each other through communication network 40. As an example of the communication network 40, an Ethernet network may be used. Data transfer from controller 20 to printer 30 may be performed through a system conforming to the standards, such as IEEE 1394, parallel or the like, in place of the Ethernet.

The printing system shown in FIG. 1 includes controller 20 and printer 30 as separated apparatuses but the printing system of the present example may include printer 30 and controller 20 included inside the printer 30 as illustrated in FIG. 2. Hereinafter, a description of each apparatus is given on the assumption of the illustrative structure of the printing system shown in FIG. 1.

Figure 3A:
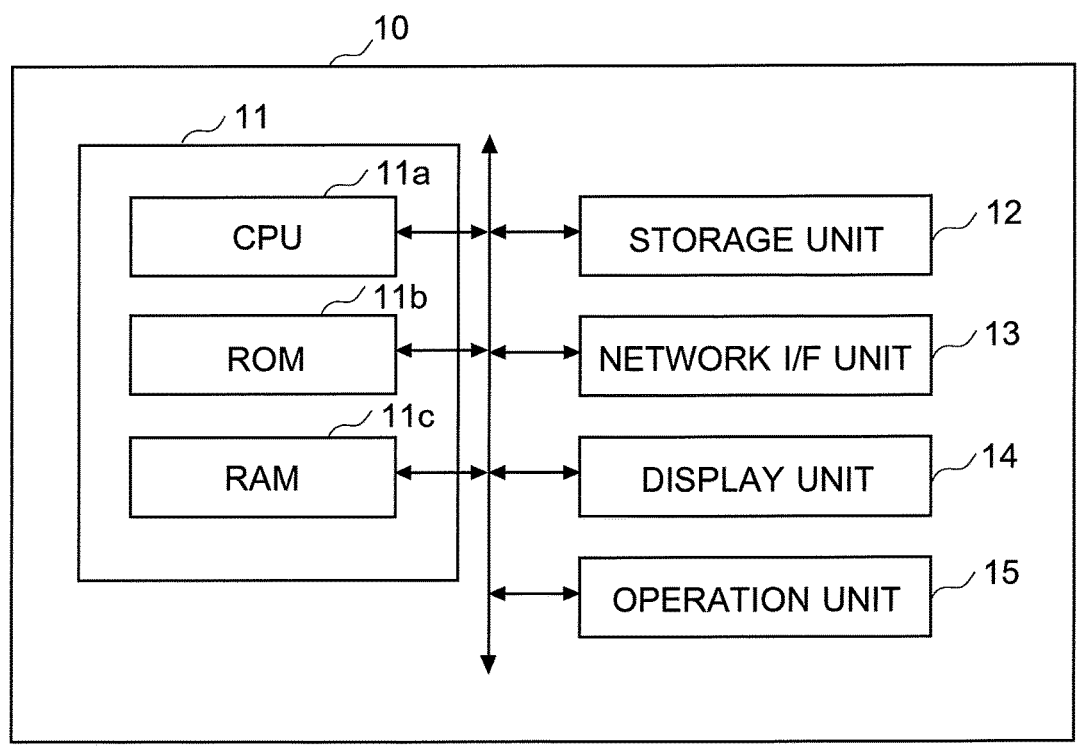
FIGS. 3A and 3B are block diagrams illustrating an example of the structure of a client terminal according to one embodiment of the present invention.

Client Terminal:

Client terminal 10 is a computing device like a personal computer and is configured to create a print job and send the print job to controller 20. The client terminal 10 includes, as illustrated in FIG. 3A, control unit 11 and storage unit 12, network interface (I/F) unit 13, display unit 14 and operation unit 15.

Figure 3B:
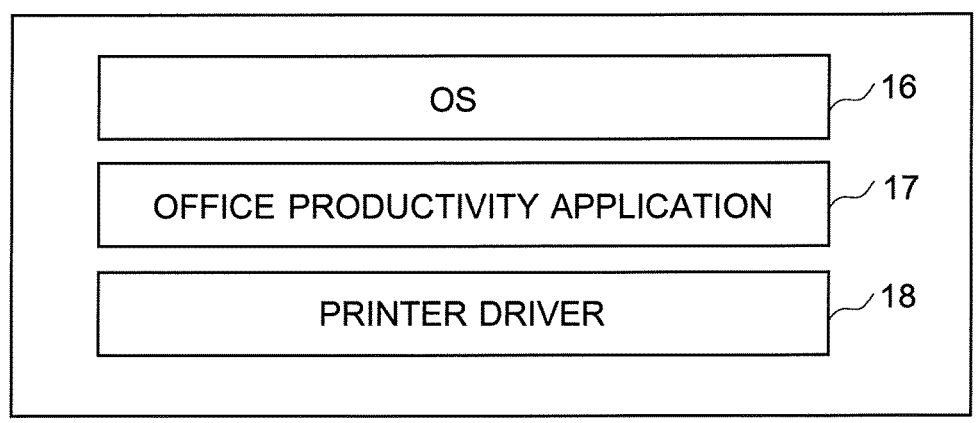

Control unit 11 includes a CPU (Central Processing Unit) 11a and memories, such as a ROM (Read Only Memory) 11b and a RAM (Random Access Memory) 11c. CPU 11a reads out control programs stored in the ROM 11b or the storage unit 12, loads the control programs onto RAM 11c, and executes the control programs, thereby controlling the overall operations of client terminal 10. The control unit 11 (CPU 11a) further executes, as illustrated in FIG. 3B, OS (Operating System) 16, office productivity application 17 and printer driver 18 and other programs.

Examples of OS 16 include Windows, OS X, macOS and Android, where Windows is a registered trademark of Microsoft Corporation in the United States and/or other countries, OS X is a registered trademarks of Apple Inc. in the U.S. and other countries, macOS is a trademark of Apple Inc. in the U.S. and other countries, and Android is a trademark of Google Inc. in the United States and/or other countries. OS 21a manages office productivity application 17 and printer driver 18 in the client terminal 10 so as to function and run the programs.

Examples of office productivity application 17 include word processing, spreadsheet, and image processing programs, and the office productivity application 17, on sending print instructions, invokes printer driver 18 and transfers original data created by the productivity application 17 to the printer driver 18.

Printer driver 18 converts original data created by the office productivity application 17 into a print job written in a language that controller 20 can interpret, where examples of the print job include PDL (Page Description Language) data written in page description languages, such as PJL (Printer Job Language), PS (PostScript) and PCL (Printer Control Language); and PDF (Portable Document Format) data. Printer driver 18 adds information of conditions for creating images set on a print setup screen of the printer driver 18 (in this example, information for specifying a target profile, printer profile, and a multidimensional color correction LUT for printer 30) by writing the information into a print ticket or the header.

Storage unit 12 includes a memory, such as a HDD (Hard Disk Drive), a SSD (Solid State Drive) or the like, which stores programs which when being executed causes CPU 11a to control components of client terminal 10, information about processing and functions of client terminal 10, original data created by office productivity application 17, a print job created by printer driver 18 and other data.

Network I/F unit 13 includes a NIC (Network Interface Card) and/or a modem. The network I/F unit 26 communicably connects client terminal 10 to communication network 40, to send a print job to controller 20.

Display unit 14 includes a display like a LCD (Liquid Crystal Display) or an OEL (organic electroluminescence) display, and displays an original creation screen of office productivity application 17, a print setup screen for generating a print job of printer driver 18, and others.

Operation unit 15 includes hardware devices, such as a mouse and a keyboard, which allows a user to perform various operations to create original by using office productivity application 17 and to set print conditions by using printer driver 18. CONTROLLER:

Controller 20 is a control apparatus that controls printer 30. Controller 20 includes, as illustrated in FIG. 4A, control unit 21, storage unit 22, raster-image processor 23 and network interface (I/F) unit 24 and printer interface (I/F) unit 25 and optionally includes a display unit and an operation unit.

Control unit 21 includes CPU 21a and memories, such as ROM 21b and RAM 21c. CPU 21a reads out control programs stored in the ROM 21b or the storage unit 22, loads the control programs onto RAM 21c, and executes the control programs, thereby controlling the overall operations of controller 20.

Storage unit 22 includes a memory, such as a HDD, a SSD or the like, which stores programs which when being executed causes CPU 21a to control components of controller 20, a print job received from client terminal 10, print image data created on the basis of a print job, a multidimensional color correction LUT for printer 30, which will be described later, ICC profiles (a target profile and a standard profile) to be used for color conversion, and other data.

Raster-image processor 23 includes an image-processing ASIC (application specific integrated circuit) and rasterizes pages of a print job to create image data. Raster image processor 23 further performs, on each pixel of the image data created, multidimensional color correction and color conversion. The multidimensional color correction is performed by using a multidimensional color correction LUT for printer 30, which will be described later, and is a process to correct colors to be printed by a user printing device into colors to be printed by a standard printing device. The color conversion is a process to match colors of printed matters with intended colors (to convert colors to be printed by the standard printing device into target colors), and examples of the color conversion include color conversion using ICC profiles. Raster-image processor 23 then creates print image data and sends the data to control unit 21. For the multidimensional color correction, turning on or off (use or nonuse) of a process of removing impurity of secondary colors (referred to as a specific process) can be specified.

Network I/F unit 24 includes a NIC and/or a modem. Network I/F unit 24 communicably connects controller 20 to communication network 40, to receive a print job from client terminal 10. Printer I/F unit 25 is a dedicated interface for connecting controller 20 to printer 30. Printer I/F unit 25 sends bitmap image data to printer 30 and instructs printer 30 about the way to output the bitmap image data.

Control unit 21, as illustrated in FIG. 4B, works as a table creation section 26 and correction control section 27.

Table creation section 26 creates a multidimensional color correction LUT for printer 30. To create the multidimensional color correction LUT for printer 30, controller 20 operates printer 30 to print a predetermined color chart including an array of color patches, further operates a color measurement device, which is prepared in the printing system, to measure colors of the chart, and obtains a result of the measurement of color patches. Table creation section 26 then creates a multidimensional color correction LUT (which will be described later in details) which associates sets of input color values (theoretical or intended values for color values of color patches) with sets of output color values to be obtained by performing the multidimensional color correction with turning off a process of removing impurity of secondary colors (without using the process of removing impurity of secondary colors) and other sets of output color values to be obtained by performing the multidimensional color correction with turning on a process of removing impurity of secondary colors (by using the process of removing impurity of secondary colors). The measurement color device may be controlled by a computing device connected to communication network 40. The color measurement may be done by an in-line color measurement device mounted inside the printer 30, in place of the above-described color measurement device.

Correction control section 27 judges the sizes of the color gamuts of a user printing device, a standard printing device and target colors, on the basis of color values of fully saturated secondary colors of the user printing device, the standard printing device and the target colors. According to the judgement result, correction control section 27 instructs raster-image processor 23 to perform the multidimensional color correction with specifying use of a LUT (first LUT) created with tuning off (without) the process of removing impurity of secondary colors, or instructs raster-image processor 23 to perform the multidimensional color correction with specifying use of a LUT (second LUT) created with turning on (by using) the process of removing impurity of secondary colors. Correction control section 27 then obtains from raster-image processor 23 print image data on which the multidimensional color correction and the color conversion were performed, and outputs the print image data to printer 30 (a print engine) to instruct to print the print image data.

A concrete description is given of the above-described judgement is given below. The correction control section 27 calculates chromas from color values of fully saturated secondary colors of the user printing device, the standard printing device and the target colors, by referring to the multidimensional color correction LUT, the printer profile for the standard printing device and the target profile, and compares the chromas with each other for each of the fully saturated secondary colors. When judging that the chroma of one of the fully saturated secondary colors of the user printing device is greater than that of the standard printing device, the correction control section 27 further compares the chroma of the fully saturated solid secondary color of the target colors with the chromas of the fully saturated solid secondary color of the user printing device and the standard printing device. When judging that the chroma of the fully saturated secondary color of the target colors is greater than that of the user printing device, the correction control section 27 instructs raster-image processor 23 to perform the multidimensional color correction with specifying use of the second LUT. On the other hand, when judging that the chroma of the fully saturated solid secondary color of the target colors is smaller than that of the standard printing device, the correction control section 27 instructs raster-image processor 23 to perform the multidimensional color correction with specifying use of the first LUT.

In the above judgement, when judging that the chroma of one of the fully saturated secondary colors of the user printing device is greater than that of the standard printing device, the correction control section 27 may perform the following processing. That is, correction control section 27 may calculate a mean of the chroma of the fully saturated secondary color of the user printing device and that of the standard device, instruct raster-image processor 23 to perform the multidimensional color correction with specifying use of the second LUT when judging that the chroma of the fully saturated secondary color of the target values is greater than the mean of the chromas, and instruct raster-image processor 23 to perform the multidimensional color correction with specifying use of the first LUT when judging that chroma of the fully saturated secondary color of the target values is not greater than the mean of the chromas.

Alternatively, in the above judgement, when judging that the chroma of one of the fully saturated secondary colors of the user printing device is greater than that of the standard printing device, the correction control section 27 may perform the following processing. That is, when judging that the chroma of the fully saturated secondary color of the target colors is not greater than that of the user printing device and is not smaller than that of the standard printing device, the correction control section 27 may calculate the ratio of a difference between the chromas of the fully saturated secondary color of the target colors and the standard printing device to a difference between the chromas of the fully saturated secondary color of the user printing device and the standard printing device. The correction control section 27 may instruct the raster-image processor to perform the multidimensional color correction with specifying use of the first LUT, when judging that the ratio is smaller than a predetermined threshold value; and may instruct the raster-image processor to perform the multidimensional color correction with specifying use of the second LUT when judging that the ratio is not smaller than a predetermined threshold value. Alternatively, when judging that the chroma of the fully saturated secondary color of the target colors is not greater than that of the user printing device and is not smaller than that of the standard printing device, the correction control section 27 may prompt a user to choose whether to cause the raster-image processor to perform the multidimensional color correction while turning off (without using) the process of removing impurity of secondary colors, by using the first LUT, or to cause the raster-image processor to perform the multidimensional color correction while turning on (by using) the process of removing impurity of secondary colors, by using the second LUT.

Alternatively, in the above judgement, when judging that the chroma of one of the fully saturated secondary colors of the user printing device is greater than that of the standard printing device, the correction control section 27 may perform the following processing. That is, when judging that a difference between the chromas of the fully saturated secondary color of the user printing device and that of the standard printing device is not greater than a predetermined second threshold value, the correction control section 27 may calculate hue angles of the fully saturated secondary color of the user printing device, the standard printing device and the target colors from the color values obtained, to compare the hue angles with each other. When judging that the hue angle of the fully saturated secondary color of the user printing device is greater than that of the standard printing device, the correction control section 27 may instruct the raster-image processor 23 to perform the multidimensional color correction, according to a comparison result of the hue angles. The correction control section 27 may instruct the raster-image processor 23 to perform the multidimensional color correction with specifying use of the second LUT for the multidimensional color correction, when judging that the hue angle of the fully saturated secondary color of the target colors has a value which is closer to the hue angle of the fully saturated secondary color of the user printing device than a mean of the hue angle of the fully saturated secondary color of the user printing device and that of the standard printing device (a value which is greater than the mean); and may instruct the raster-image processor 23 to perform the multidimensional color correction with specifying use of the first LUT for the multidimensional color correction, when judging that the hue angle of the fully saturated secondary color of the target colors has a value which is equal to the mean or is closer to the hue angle of the fully saturated secondary color of the standard printing device than the mean (a value which is not greater than the mean).

The table creation section 26 and the correction control section 27 may be constituted as hardware devices. Alternatively, the table creation section 26 and the correction control section 27 may be provided by a multidimensional color correction program which causes the control unit 21 to function as these sections when being executed by CPU 21a. That is, the control unit 21 may be configured to serve as the table creation section 26 and the correction control section 27, when CPU 21a executes the multidimensional color correction program.

Printer:

Printer 30 is an image forming apparatus (a user printing device) like a MFP (Multi-Functional Peripheral), which performs printing according to instructions given by controller 20. Printer 30 includes, as illustrated in FIG. 5, control unit 31, controller interface (I/F) unit 32, panel-display and operation unit 33 and print processing unit 34.

Control unit 31 includes CPU 31a and memories, such as ROM 31b a RAM 31c. CPU 31a reads out control programs stored in ROM 31b, loads the control programs onto RAM 31c, and executes the control programs, thereby controlling the overall operations of printer 30.

Controller I/F unit 32 is a dedicated interface for connecting printer 30 to controller 20, and is configured to receive print image data from controller 20.

Panel-display and operation unit 33 is a device, such as a touch panel, which includes a display unit like a LCD and a touch sensor including transparent electrodes arranged in a lattice shape on the display unit. The panel-display and operation unit 33 displays various screens relating to printing so as to allow a user to perform various operations relating to printing.

Print processing unit 34 is a print engine that forms images by using at least three primary colors (for example, C, M and Y colors) which are different in hue from each other. In concrete terms, the print processing unit 34 includes an exposure unit, a photoreceptor drum, a charging unit, a developing unit, a transfer belt, a fixing unit and so on, and performs following processes. That is, the exposure unit performs exposure processing by irradiating the photoreceptor drum, which was charged by the charging unit, with a laser beam in accordance with an image, to form latent images on the photoreceptor drum. The developing unit develops the latent image by adhering charged toner onto the photoreceptor drum, and the developed toner image is transferred onto the transfer belt (first transfer processing), further is transferred from the transfer belt onto a sheet of paper (second transfer processing), and are fixed onto the sheet by the fixing unit. Further, the print processing unit 34 optionally includes an in-line color measurement device (spectrophotometer) supporting spectrophotometry which is put on a paper conveyance path and is capable of measuring the light intensity at each wavelength, similarly to an external color measurement device.

It should be noted that FIG. 1 to FIG. 5 show one printing system and its components of the present example for illustrative purpose only, and the constitution and control of each apparatus in the system can be modified appropriately as long as an apparatus in the printing system can realize the multidimensional color correction method of the present example.

For example, the above-described printing system employs raster-image processor 23 of controller 20, configured to perform multidimensional color correction on each pixel of image data by using the multidimensional color correction LUT. Alternatively, the printing system may employ print processing unit 34 of printer 30, configured to perform the multidimensional color correction on each pixel of image data by using the multidimensional color correction LUT. Such a printer may be realized by causing control unit 31 of printer 30 to work similarly to correction control unit 27, or to table creation section 26 and correction control 27 (when CPU 31a of printer 30 executes the multidimensional color correction program). Further, in the above-described printing system, raster-image processor 23 of controller 20 performs just the multidimensional color correction, as color correction performed on image data, but print processing unit 34 of printer 30 may perform additional color correction on the image data other than the multidimensional color correction.

Hereinafter, a description of the operation is given of controller 20 having the above structure. CPU 21a reads a multidimensional color correction program stored in ROM 21b or storage unit 22, loads the program onto RAM 21c, and executes the program, thereby performing processes of the steps shown in the flowcharts of FIG. 6 and FIG. 7. The following description is given under the assumption that printer 30 performs electrophotographic printing by using color materials in C (cyan), M (magenta), Y (yellow) and K (black) colors and that multidimensional color correction is performed by using a three-dimensional color correction LUT including sets of CMY color values.

First, a description is given of creation of a multidimensional color correction LUT with reference to the flowchart illustrated in FIG. 6.

Controller 20 operates printer 30 to print a predetermined color chart including an array of color patches having color values needed for creating a multidimensional color correction LUT. Controller 20 further operates a color measurement device (or an in-line color measurement device put inside printer 30) to measure colors of the color chart and obtains measured color values of each of the color patches (S101). The color chart may have an arbitrary construction as far as colors of the color patches include all the combinations of primary colors in the multidimensional color correction LUT. For example, the color chart may include 216 (=6×6×6) colors patches which are prepared by changing values of each of CMY colors to 0%, 10% 20% 40% 70% and 100%.

Next, control unit 21 (table creation section 26) calculates output color values to be obtained by performing the multidimensional color correction on input color values while tuning off (without using) a process of removing impurity of secondary colors, where the input color values are predetermined target color values. Control unit 21 (table creation section 26) then calculates a color correction LUT (a first LUT) in which the calculated output color values are indexed by the input color values (S102). Color values needed for this calculation can be estimated by using commonly known techniques. In this process, since the process of removing impurity of secondary colors is turned off (is not used) in the color correction, output color values indexed by a set of input color values indicating a secondary color (in which any one of CMY as the input primary colors, referred to as a third input primary color component, has the value of zero), are not restricted in the color correction, and there is no need to preserve the output color value for the third input primary color component, which does not form the secondary color, to be zero.

Next, control unit 21 (table creation section 26) calculates output color values to be obtained by performing the multidimensional color correction on input color values while tuning off (by using) the process of removing impurity of secondary colors, where the input color values are predetermined target color values. Control unit 21 (table creation section 26) then calculates a color correction LUT (a second LUT) in which the calculated output color values are indexed by the input color values (S103). Color correction while turning on (or by using) a process of removing impurity of secondary colors means correcting input color values indicating a secondary color (in which any one of CMY, referred to as a third input primary color component, has the value of zero) into the corresponding output color values so as to preserve the output color value for the third input primary color component to be zero. Color values needed for this calculation can be estimated by using commonly known techniques. When using a process of removing impurity of secondary colors, it is preferable to employ an algorithm such that the chroma of output color values obtained by using the process of removing impurity of secondary colors is higher than that obtained without using the process of removing impurity of secondary colors. The control unit 21 (table creation section 26) calculates the output values to be obtained when performing the multidimensional color correction while turning on the process of removing impurity of secondary colors, on all the secondary colors, to obtain the second LUT, where the secondary colors in this example are R or red (=M+Y), G or green (=C+Y), and B or blue (=C+M).

Next, control unit 21 (table creation section 26) stores into storage unit 22*a* multidimensional correction LUT including the correction LUT (the first LUT) including output color values to be obtained when performing the multidimensional color correction while turning off the process of removing impurity of secondary colors, obtained at S102; the correction LUT (the second LUT) including output color values to be obtained when performing the multidimensional color correction while turning on the process of removing impurity of secondary colors, obtained at S103; and color values of fully saturated secondary colors (S104). The fully saturated secondary colors are colors each composed of CMY color values as primary color values such that two of the CMY color values have the maximum value (which can be represented by the saturated value, 100%, or 255 if the values are represented by 0 to 255 levels) and the other has a zero value. In this example, the fully saturated secondary colors are three colors of the fully saturated red (=100% magenta+100% yellow), the fully saturated green (=100% cyan+100% yellow), and the fully saturated blue (=100% cyan+100% magenta).

FIG. 8A illustrates an example of the multidimensional color correction LUT of the present example. In the figure, the color values of the fully saturated secondary colors are omitted. In comparison with a conventional multidimensional color correction LUT illustrated in FIG. 8B, the multidimensional color correction LUT of FIG. 8A includes two sets of "OUTPUT" values as output color values: one set of output color values to be obtained by performing the multidimensional color correction while turning on (with) the process of removing impurity of secondary colors, and the other set of output color values to be obtained by performing the multidimensional color correction while turning off (without) the process of removing impurity of secondary colors. There is no need to prepare color values in the hatched part (a part corresponding to one of the two sets of output color values in the common table) in the table shown in FIG. 8A, since the multidimensional color correction performed on colors other than the secondary colors result in the same output color values whether the process of removing impurity of secondary colors is on or off (used or not used). Though the volume of the table each for R, G and B colors as the secondary colors, accounts for about 5 percent of the whole data of the multidimensional color correction LUT, the volume of the common table accounts for about 85 percent of the whole data of the multidimensional color correction LUT. Therefore, insignificant increase in time and data size needed for creating the multidimensional color correction LUT, may arise due to adding a LUT for the multidimensional color correction with the process of removing impurity of secondary colors, into the multidimensional correction LUT of the present example. Further, the multidimensional color correction LUT of the present example can have an arbitrary format as far as the multidimensional color correction LUT is in the form such that an appropriate part, which corresponds to the secondary colors, of the LUT (for example, the appropriated part of a set of output color values for the multidimensional correction with the process of removing impurity of secondary colors or the other set of output color values for the multidimensional correction without the process of removing impurity of secondary colors) can be selectively used when performing the multidimensional color correction, and the multidimensional color correction LUT further includes the color values indicating the fully saturated secondary colors. For example, the multidimensional color correction LUT may include tags which are added to the two sets of output color values so as to be selectively used for the multidimensional color correction.

The control unit 21 may create plural multidimensional color correction LUTs corresponding to, for example, paper kinds (brand names of paper), paper types (coated paper, wood-free paper and plain paper), or other categories of paper. In particular, since there are a significant difference generally between a gamut of colors represented on coated paper and that a gamut of colors represented on uncoated paper, the control unit 21 preferably creates different multidimensional color correction LUTs at least for coated paper and uncoated paper. The control unit 21 may record the multidimensional color correction LUT or LUTs into an arbitrary place in place of the storage unit 22 in the controller 20. For example, if the printing system is configured to perform the multidimensional color correction by using print processing unit 34 (print engine) of printer 30, the control unit 21 may record the multidimensional color correction LUT or LUTs in a storage unit prepared in the print processing unit 34.

Next, a description is given of print processing of a job, with reference to the flowchart shown in FIG. 7. In the present example, it is assumed that the control unit 21 has already created the multidimensional color correction LUT prior to the print processing of a job. However, the control unit 21 can create the multidimensional color correction LUT before the judging process of correction control section 47 using the chromas of each fully saturated secondary color or any other process prior to the judging process.

First, control unit 21 of controller 20 receives a print job (S201). For example, the control unit 21 may get a PDF file as a print job from client terminal 20 through communication network 40 or may get a print job prepared by creating original data with office productivity application 17 and converting the original data with printer driver 18 in client terminal 10. The print job is associated directly or indirectly with a target profile to be used for color conversion, a printer profile and a multidimensional color correction LUT, where "associated indirectly" means, for example, a situation that a print job includes a specification of paper kind in place of a specification of a multidimensional color correction LUT and that controller 20 stores information to associate the paper kind and the multidimensional color correction LUT separately from the print job.

Next, control unit 21 reads a target profile, a printer profile (standard profile) and a multidimensional color correction LUT, each corresponding to the print job, from storage unit 22 or another storage (S202).

Next, control unit 21 (correction control section 27) extracts color values indicating each fully saturated secondary color of the target colors, the standard printing device and the user printing device, from the profiles and the LUT read in S202, and calculates the chromas of each fully saturated secondary color from the color values extracted (S203). In concrete terms, the control unit 21 (correction control section 27) extracts color values indicating one of the fully saturated secondary colors of the target colors from the target profile, extracts color values indicating the fully saturated secondary color of the standard printing device from the printer profile (the standard profile), and extracts color values indicating the fully saturated secondary color of the user printing device from the multidimensional color correction LUT. The control unit 21 (correction control section 27) optionally calculates a mean (an arithmetic mean) of the chroma of the fully saturated secondary color of the user printing device and that of the standard printing device. The control unit 21 (correction control section 27) performs this processing for each of the fully saturated secondary colors: the fully saturated red, the fully saturated green and the fully saturated blue.

Since each of the target profile and the printer profile includes color values corresponding to device-dependent color values (for an example of the fully saturated red, 0% cyan, 100% magenta, 100% yellow and 0% black) in a A2B table (AtoB tags) in the profile, the control unit 21 (correction control section 27) can obtain the color values of the fully saturated secondary colors by reading the color values in the profiles in accordance with the ICC profile specifications. The chroma of a fully saturated secondary color can be calculated from the color values obtained. For example, chroma C* is given by the following expression in the L*a*b* color system.

$$C^* = (a^{*2} + b^{*2})^{1/2} \quad (1)$$

Next, control unit 21 (correction control section 27) compares the chroma of each of the fully saturated secondary colors of the user printing device (which is indicated by C*_U in FIG. 7) and that of the standard printing device (which is indicated by C*_S in FIG. 7) (S204). When the comparison results in "C*_U>C*_S", the color correction may make an area of colors that can be output by the user printing device but are unavailable in the color gamut of the user printing device. Therefore, the processing goes to the process of S205 and control unit 21 (correction control section 27) further compares the chroma of the fully saturated secondary color of target colors (which is indicated by C*_T in FIG. 7) with that of the user printing device (C*_U) and that the standard printing device (C*_S). On the other hand, when the comparison results in "C*_U≤C*_S", the color correction may make no area of colors that can be output by the user printing device but are unavailable in the color gamut of the user printing device. Therefore, control unit 21 (correction control section 27) instructs raster-image processor 23 to perform the multidimensional color correction while specifying use of the multidimensional color correction LUT without using the process of removing impurity of secondary colors (S207). The control unit 21 (correction control section 27) performs these processing for each of the fully saturated secondary colors: the fully saturated red, the fully saturated green and the fully saturated blue.

Next, control unit 21 (correction control section 27) compares the chroma of one of the fully saturated secondary colors of the target colors (which is indicated by C*_T in FIG. 7) with that of the user printing device (C*_U) and/or that of the standard printing device (C*_S) (S205). For example, the control unit 21 (correction control section 27) judges whether the relationship of "C*_T>C*_U", "C*_T<C*_S" or "C*_T>the mean of C*_U and C*_S" holds for one of the fully saturated secondary colors. The control unit 21 (correction control section 27) performs this processing for each of the fully saturated secondary colors: the fully saturated red, the fully saturated green and the fully saturated blue, which satisfies "C*_U>C*_S". The control unit 21 (correction control section 27) may calculate the mean of the chroma of each fully saturated secondary color of the user printing device and that of the standard printing device in this step.

When judging that "C*_T>C*_U" or "C*_T>the mean of C*_U and C*_S" holds for one of the fully saturated secondary colors (judgement result A), the control unit 21 (correction control section 27) instructs raster-image processor 23 to perform the multidimensional color correction on the fully saturated secondary color while specifying use of the color correction LUT (the second LUT) to be used for the color correction with the process of removing impurity of secondary colors, so as to make no impurity in corrected target colors (S206). When judging that "C*_T<C*_S" or "C*_T≤the mean of C*_U and C*_S" holds for one of the fully saturated secondary colors (judgement result B), the control unit 21 (correction control section 27) instructs raster-image processor 23 to perform the multidimensional color correction on the fully saturated secondary color while specifying use of the color correction LUT (the first LUT) to be used for the color correction without the process of removing impurity of secondary colors, so as not to worsen the color reproducibility due to the process of removing impurity of secondary colors (S207). The control unit 21 (correction control section 27) performs this processing for each of the fully saturated secondary colors: the fully saturated red, the fully saturated green and the fully saturated blue. In case that the judgement results for the fully saturated secondary colors (red, green and blue) are different from each other, the control unit 21 (correction control section 27) can specify raster-image processor 23 to use the different color correction LUTs (the first and second LUTs) separately for the corresponding fully saturated secondary colors, as judged.

After that, the print job is processed by using the color correction LUT or LUTs as specified (S208). In concrete terms, raster-image processor 23 rasterizes pages of a print job to create image data, and raster-image processor 23, for each pixel of the image data created, corrects color of the user printing device (printer 30) to color equivalent to that of the standard printing device by using the color correction LUT specified by control unit 21 (correction control section 27), according to the instructions of correction control section 27. Then, the raster-image processor 23 converts the corrected colors into those equivalent to the target colors by using the target profile and the printer profile (the standard profile), to output data of the resulting print image on which the color correction and the color conversion were performed. Then, correction control section 27 obtains the data of the resulting print image from the raster-image processor 23, and outputs the data of the print image to printer 30 (a print engine) to gives the printer 30 (the print engine) print instructions. The application of the color correction LUT to data of print image may be performed by an arbitrary device. For example, raster-image processor 23 of controller 20 may apply the color correction LUT on data of print image and send print instructions to printer 30, or print processing unit 34 of printer 30 may apply the color correction LUT on print image data and print the data. The printing system of the present example may use an ordinary print method for processes other than the process of applying the color correction LUT to the print image data.

Next, detailed examples of the above-described judgements at S204 and S205 are given. As an example illustrated in FIG. 9, the control unit 21 (correction control section 27) can make the following judgement under the condition that the color gamut of the user printing device is wider than the color gamut of the standard printing device, in other words, when judging that the chroma of one of the fully saturated secondary colors of the user printing device is greater than that of the standard printing device. When, under the condition, further judging that the chroma of the fully saturated secondary color of the target colors of the color conversion is greater than the mean (the middle point) of the chroma of the fully saturated secondary color of the user printing device and that of the standard printing device (in the case of color conversion target 1 in FIG. 9), the control unit 21 (correction control section 27) can instruct raster-image processor 23 to perform the multidimensional color correction with specifying use of the color correction LUT to be used for the color correction with (by turning on) the process of removing impurity of secondary colors. On the other hand, when, under the above-described condition, further judging that the chroma of the fully saturated secondary color of the target colors of the color conversion is not greater than the mean (the middle point) of the chroma of the fully saturated secondary color of the user printing device and that of the standard printing device (in case of in case of color conversion target 2 in FIG. 9), the control unit 21 (correction control section 27) can instruct raster-image processor 23 to perform the multidimensional color correction by specifying use of the color correction LUT to be used for the color correction without the process of removing impurity of secondary colors.

In the example of FIG. 9, the control unit 21 (correction control section 27) made two judgement results on the basis of the mean (the middle point) of the chroma of one of the fully saturated secondary colors of the user printing device and that of the standard printing device. Alternatively, as another example illustrated in FIG. 10, the control unit 21 (correction control section 27) may make the three judgment results under the condition that the chroma of one of the fully saturated secondary colors of the user printing device is greater than that of the standard printing device. When, under the condition, further judging that the chroma of the fully saturated secondary color of the target colors of the color conversion is greater than the fully saturated secondary color of the user printing device (in the case of color conversion target 1 in FIG. 10), the control unit 21 (correction control section 27) may instruct raster-image processor 23 to perform the multidimensional color correction by specifying use of the color correction LUT to be used for the color correction with the process of removing impurity of secondary colors. When, under the above-described condition, further judging that the chroma of the fully saturated secondary color of the target colors of the color conversion is smaller than that of the standard printing device (in the case of color conversion target 2 in FIG. 10), the control unit 21 (correction control section 27) may instruct raster-image processor 23 to perform the multidimensional color correction by specifying use of the color correction LUT to be used for the color correction without the process of removing impurity of secondary colors. When, under the above-described condition, further judging that the chroma of the fully saturated secondary color of the target colors is not smaller than that of the standard printing device and is not greater than the user printing device, the control unit 21 (correction control section 27) may separately define whether to specify use of the color correction LUT to be used for the color correction with the process of removing impurity of secondary colors or the color correction LUT to be used for the color correction without the process of removing impurity of secondary colors.

For example, the control unit 21 (correction control section 27) may compare the ratio of the difference of the chroma of one of the fully saturated secondary colors (the ratio of the difference of the chroma of the fully saturated secondary color of target colors of the color conversion and that of the standard printing device to the difference of the chroma of the fully saturated secondary color of the user printing device and that of the standard printing device) with a predetermined threshold value. Then, when judging that the ratio of the difference of the chroma of the fully saturated secondary color is smaller than the threshold value, the control unit 21 (correction control section 27) may instruct raster-image processor 23 to perform the multidimensional color correction by specifying use of the color correction LUT to be used for the color correction without the process of removing impurity of secondary colors. On the other hand, when judging that the ratio of the difference of the chroma of the fully saturated secondary color is not smaller than the threshold value, the control unit 21 (correction control section 27) may instruct raster-image processor 23 to perform the multidimensional color correction by specifying the color correction LUT to be used for the color correction with the process of removing impurity of secondary colors. The threshold value can be set to an arbitrary value, but if there is a demand to perform the multidimensional color correction by using (or without using) the process of removing impurity of secondary colors, as much as possible, the threshold value is preferably as great (small) as possible. As another example, when judging that the chroma of one of the fully saturated secondary colors of the target colors of the color conversion is not smaller than that of the standard printing device and is not greater than that of the user printing device, the following processing, for example, may be performed. That is, the control unit 21 (correction control section 27) may cause a display unit prepared in controller 20 to display a screen (or an user interface) which allows a user to select whether to specify use of the color correction LUT to be used for the color correction using the process of removing impurity of secondary colors or that to be used for the color correction without using the process of removing impurity of secondary colors. Then, a user may operate the screen (the user interface) to select either of the color correction LUT to be for the color correction with using the process of removing impurity of secondary colors or that to be used for the color correction without using the process of removing impurity of secondary colors.

As another example, under the condition that the chroma of one of the fully saturated secondary colors of the user printing device and that of the standard printing device are almost the same (for example, the difference between the chromas ΔC*<1.0) and the difference of the chroma of the fully saturated secondary color of the user printing device and that of the standard printing device is not greater than a predetermined threshold value, the control unit 21 may make another judgement based on hue angles. To make this judgement, the control unit 21, at the step S203 in FIG. 7, calculates the hue angle "h" by using the following expression (2), from the color values (L*a*b* values) indicating the fully saturated secondary color.

$$h = \arctan(b^*/a^*)/\pi \times 180 \qquad (2)$$

Under the condition that the hue angle of the fully saturated secondary color of the user printing device is greater than that of the standard printing device, the control unit 21, for example, can make the following judgement. When, under the condition, further judging that the hue angle of the fully saturated secondary color of the target colors of the color conversion has a value which is closer to the hue angle of the fully saturated secondary color of the user printing device than the mean (the middle point) of the hue angle of the fully saturated secondary color of the user printing device and that of the standard printing device (a value which is greater than the mean), the control unit 21 (correction control section 27) can instruct raster-image processor 23 to perform the multidimensional color correction with specifying use of the color correction LUT to be used for the color correction with (by turning on) the process of removing impurity of secondary colors. On the other hand, when, under the above-described condition, further judging that the hue angle of the fully saturated secondary color of the target colors of the color conversion has a value which is equal to the mean or is closer to the hue angle of the fully saturated secondary color of the standard printing device than the mean (the middle point) (a value which is not greater than the mean), the control unit 21 (correction control section 27) can instruct raster-image processor 23 to perform the multidimensional color correction by specifying use of the color correction LUT to be used for the color correction without the process of removing impurity of secondary colors.

The present invention should not be limited to the above embodiments and examples, and their constitution and control can be modified unless the modification deviates from the meaning of the present invention.

For example, in the above-described examples, there was provided the processing of the control unit of the controller (the control apparatus), to switch, on the basis of the mean (the middle point) of the chroma of one of the fully saturated secondary colors of the user printing device and that of the standard printing device, one to the other of the color correction LUT to be used for the color correction with (by turning on) the process of removing impurity of secondary colors and the color conversion LUT to be used for the color correction without (by turning off) the process of removing impurity of secondary colors. Further, there was provided another processing of the control unit of the controller (the control apparatus) that separately defines whether to use the color correction LUT to be used for the color correction with (by turning on) the process of removing impurity of secondary colors or the color correction LUT to be used for the color correction without (by turning off) the process of removing impurity of secondary colors, when judging that the chroma of one of the fully saturated secondary colors of the target colors is not smaller than that of the standard printing device and is not greater than that of the user printing device. Alternatively, the control unit of the controller may arbitrarily specify whether to use the color correction LUT to be used for the color correction with (by turning on) the process of removing impurity of secondary colors or the color correction LUT to be used for the color correction without (by turning off) the process of removing impurity of secondary colors, as far as, under the condition that the color gamut of the user printing device is greater than that of the standard printing device, the multidimensional color correction can be performed with (by turning on) the process of removing impurity of secondary colors when the color gamut of target colors is greater than that of the user printing device, and the multidimensional color correction can be performed without (by turning off) the process of removing impurity of secondary colors when the color gamut of target colors is smaller than that of the standard printing device.

In the above examples, the use or nonuse (on or off) of the process of removing impurity of secondary colors was switched. As for the primary colors, the multidimensional color correction can be performed by consistently using a color correction LUT with (by turning on) the process of removing impurity of primary colors.

The present invention is applicable to a control apparatus that performs color correction by using a LUT including multidimensional data sets of color components, a multidimensional color correction method for use in a printing system including the control apparatus, a multidimensional color correction program to be executed in the control apparatus, a non-transitory computer-readable storage medium storing the multidimensional color correction program.

The invention claimed is:

1. A control apparatus for controlling a user printing device equipped with a print engine that forms images by using at least three primary colors which are different in hue from each other, the control apparatus comprising:
   a raster-image processor that performs multidimensional color correction and color conversion on image data created from a print job, the multidimensional color correction being a process to correct colors to be output by the user printing device into colors to be output by a predetermined standard printing device, by using a multidimensional LUT (look-up table) which associates input color values of three or more primary colors with corresponding output color values, the color conversion being a process to convert colors to be output by the standard printing device into target colors, by using a printer profile for the standard printing device and a target profile; and
   a control unit that controls the raster-image processor, and includes
      a table creation section that creates the multidimensional LUT including a first LUT and a second LUT, the first LUT including output color values which are indexed by the input color values and are to be obtained by the multidimensional color correction performed on the input color values without a specific process, the specific process being a process to preserve values of complementary color components of secondary colors before and after the multidimensional color correction, the second LUT including output color values which are indexed by the input color values and are to be obtained by the multidimensional color correction performed on the input color values with the specific process, and a correction control section that
obtains color values of fully saturated secondary colors of the user printing device, the standard printing device and the target colors, by referring to the multidimensional LUT, the printer profile for the standard printing device and the target profile,
calculates chromas of the fully saturated secondary colors of the user printing device, the standard printing device and the target colors from the color values obtained, to compare the chromas with each other for each of the fully saturated secondary colors, and
on judging that the chroma of one of the fully saturated secondary colors of the user printing device is greater than the chroma of the one of the fully saturated secondary colors of the standard printing device, gives the raster-image processor an instruction to perform the multidimensional color correction while specifying use of the first LUT or the second LUT on a basis of the chromas of the one of the fully saturated secondary colors, so as to
instruct the raster-image processor to perform the multidimensional color correction while specifying use of the second LUT, on judging that the chroma of the one of the fully saturated secondary colors of the target colors is greater than the chroma of the one of the fully saturated secondary colors of the user printing device, and
instruct the raster-image processor to perform the multidimensional color correction while specifying use of the first LUT, on judging that the chroma of the one of the fully saturated secondary colors of the target colors is smaller than the chroma of the one of the fully saturated secondary colors of the standard printing device, and
outputs print image data on which the raster-image processor performed the multidimensional color correction and the color conversion, to the print engine and gives the print engine a print instruction.

2. The control apparatus of claim 1,
wherein on judging that the chroma of the one of the fully saturated secondary colors of the user printing device is greater than the chroma of the one of the fully saturated secondary colors of the standard printing device, the correction control section
calculates a mean of the chromas of the one of the fully saturated secondary colors of the user printing device and the standard printing device,
instructs the raster-image processor to perform the multidimensional color correction while specifying use of the second LUT, on judging that the chroma of the one of the fully saturated secondary colors of the target colors is greater than the mean of the chromas, and
instructs the raster-image processor to perform the multidimensional color correction while specifying use of the first LUT, on judging that the chroma of the one of the fully saturated secondary colors of the target colors is not greater than the mean of the chromas.

3. The control apparatus of claim 1,
wherein on judging that the chroma of the one of the fully saturated secondary colors of the user printing device is greater than the chroma of the one of the fully saturated secondary colors of the standard printing device, the correction control section
compares the chroma of the one of the fully saturated secondary colors of target colors with the chromas of the one of the fully saturated secondary colors of the user printing device and the standard device,
calculates a ratio of a first difference between the chromas of the one of the fully saturated secondary colors of the target colors and the standard device to a second difference between the chromas of the one of the fully saturated secondary colors of the user printing device and the standard printing device, on judging that the chroma of the one of the fully saturated secondary colors of the target colors is not greater than the chroma of the one of the fully saturated secondary colors of the user printing device and is not smaller than the chroma of the one of the fully saturated secondary colors of the standard printing device,
instructs the raster-image processor to perform the multidimensional color correction while specifying use of the first LUT, on judging that the ratio is smaller than a predetermined threshold value, and
instructs the raster-image processor to perform the multidimensional color correction while specifying use of the second LUT, on judging that the ratio is not smaller than the predetermined threshold value.

4. The control apparatus of claim 1,
wherein on judging that the chroma of the one of the fully saturated secondary colors of the user printing device is greater than the chroma of the one of the fully saturated secondary colors of the standard printing device, the correction control section
compares the chroma of the one of the fully saturated secondary colors of target colors with the chromas of the one of the fully saturated secondary colors of the user printing device and the standard device, and
prompts a user to choose whether to cause the raster-image processor to perform the multidimensional color correction without the specific process by using the first LUT or to perform the multidimensional color correction with the specific process by using the second LUT, on judging that the chroma of the one of the fully saturated secondary colors of the target colors is not greater than the chroma of the one of the fully saturated secondary colors of the user printing device and is not smaller than the chroma of the one of the fully saturated secondary colors of the standard printing device.

5. The control apparatus of claim 1,
wherein on judging that the chroma of the one of the fully saturated secondary colors of the user printing device is greater than the chroma of the one of the fully saturated secondary colors of the standard printing device and that a difference between the chromas of the one of the fully saturated secondary colors of the user printing device and the standard printing device is not greater than a second predetermined threshold, the correction control section calculates hue angles of the fully saturated secondary colors of the user printing device, the standard printing device and the target colors from the color values of the one of the fully saturated secondary colors, to compare the hue angles with each other, and on judging that the hue angle of the one of the fully saturated secondary colors of the user printing device is greater than the hue angle of the one of the fully saturated secondary colors of the standard printing device, gives the raster-image processor an instruction to perform the multidimensional color correction while specifying use of the first LUT or the second LUT on a basis of the hue angles, so as to instruct the raster-image processor to perform the multidimensional color correction while specifying use of the second LUT, on judging that the hue angle of the one of the fully saturated secondary colors of the target colors has a value which is closer to the hue angle of the one of the fully saturated secondary colors of the user printing device than a mean of the hue angles of the one of the fully saturated secondary colors of the user printing device and the standard printing device, and instruct the raster-image processor to perform the multidimensional color correction while specifying use of the first LUT, on judging that the hue angle of the one of the fully saturated secondary colors of the target colors has a value which is equal to the mean of the hue angles or closer to the hue angle of the one of the fully saturated secondary colors of the standard printing device than the mean of the hue angles.

6. A multidimensional color correction method for use in a printing system including a user printing device and a control apparatus which controls the user printing device, the user printing device including a print engine that forms images by using at least three primary colors which are different in hue from each other, the control apparatus including a raster-image processor that performs multidimensional color correction and color conversion on image data created from a print job, the multidimensional color correction being a process to correct colors to be output by the user printing device into colors to be output by a predetermined standard printing device, by using a multidimensional LUT (look-up table) which associates input color values of three or more primary colors with corresponding output color values, the color conversion being a process to convert colors to be output by the standard printing device into target colors, by using a printer profile for the standard printing device and a target profile, the multidimensional color correction method comprising:

creating the multidimensional LUT including a first LUT and a second LUT, the first LUT including output color values which are indexed by the input color values and are to be obtained by the multidimensional color correction performed on the input color values without a specific process, the specific process being a process to preserve values of complementary color components of secondary colors before and after the multidimensional color correction, the second LUT including output color values which are indexed by the input color values and are to be obtained by the multidimensional color correction performed on the input color values with the specific process;

obtaining color values of fully saturated secondary colors of the user printing device, the standard printing device and the target colors, by referring to the multidimensional LUT, the printer profile for the standard printing device and the target profile;

calculating chromas of the fully saturated secondary colors of the user printing device, the standard printing device and the target colors from the color values obtained, to compare the chromas with each other for each of the fully saturated secondary colors;

on judging that the chroma of one of the fully saturated secondary colors of the user printing device is greater than the chroma of the one of the fully saturated secondary colors of the standard printing device, giving the raster-image processor an instruction to perform the multidimensional color correction while specifying use of the first LUT or the second LUT on a basis of the chromas of the one of the fully saturated secondary colors, the giving the raster-image processor to the instruction on the basis of the chromas, including instructing the raster-image processor to perform the multidimensional color correction while specifying use of the second LUT, on judging that the chroma of the one of the fully saturated secondary colors of the target colors is greater than the chroma of the one of the fully saturated secondary colors of the user printing device, and instructing the raster-image processor to perform the multidimensional color correction while specifying use of the first LUT, on judging that the chroma of the one of the fully saturated secondary colors of the target colors is smaller than the chroma of the one of the fully saturated secondary colors of the standard printing device; and outputting print image data on which the raster-image processor performed the multidimensional color correction and the color conversion, to the print engine and giving the print engine a print instruction.

7. The multidimensional color correction method of claim 6, wherein the giving the raster-image processor to the instruction on the basis of the chromas, includes on judging that the chroma of the one of the fully saturated secondary colors of the user printing device is greater than the chroma of the one of the fully saturated secondary colors of the standard printing device, calculating a mean of the chromas of the one of the fully saturated secondary colors of the user printing device and the standard printing device, instructing the raster-image processor to perform the multidimensional color correction while specifying use of the second LUT, on judging that the chroma of the one of the fully saturated secondary colors of the target colors is greater than the mean of the chromas, and instructing the raster-image processor to perform the multidimensional color correction while specifying use of the first LUT, on judging that the chroma of the one of the fully saturated secondary colors of the target colors is not greater than the mean of the chromas.

8. The multidimensional color correction method of claim 6, wherein the giving the raster-image processor to the instruction on the basis of the chromas, includes on judging that the chroma of the one of the fully saturated secondary colors of the user printing device is greater than the chroma of the one of the fully saturated secondary colors of the standard printing device, comparing the chroma of the one of the fully saturated secondary colors of target colors with the chromas of the one of the fully saturated secondary colors of the user printing device and the standard device, calculating a ratio of a first difference between the chromas of the one of the fully saturated secondary colors of the target colors and the standard device to a second difference between the chromas of the one of the fully saturated secondary colors of the user printing device and the standard printing device, on judging that the chroma of the one of the fully saturated secondary colors of the target colors is not greater than the chroma of the one of the fully saturated secondary colors of the user printing device and is not smaller than the chroma of the one of the fully saturated secondary colors of the standard printing device, instructing the raster-image processor to perform the multidimensional color correction while specifying use of the first LUT, on judging that the ratio is smaller than a predetermined threshold value, and instructing the raster-image processor to perform the multidimensional color correction while specifying use of the second LUT, on judging that the ratio is not smaller than the predetermined threshold value.

9. The multidimensional color correction method of claim 6, wherein the giving the raster-image processor to the instruction on the basis of the chromas, includes on judging that the chroma of the one of the fully saturated secondary colors of the user printing device is greater than the chroma of the one of the fully saturated secondary colors of the standard printing device, comparing the chroma of the one of the fully saturated secondary colors of target colors with the chromas of the one of the fully saturated secondary colors of the user printing device and the standard device, and prompting a user to choose whether to cause the raster-image processor to perform the multidimensional color correction without the specific process by using the first LUT or to perform the multidimensional color correction with the specific process by using the second LUT, on judging that the chroma of the one of the fully saturated secondary colors of the target colors is not greater than the chroma of the one of the fully saturated secondary colors of the user printing device and is not smaller than the chroma of the one of the fully saturated secondary colors of the standard printing device.

10. The multidimensional color correction method of claim 6, wherein the giving the raster-image processor to the instruction on the basis of the chromas, includes on judging that the chroma of the one of the fully saturated secondary colors of the user printing device is greater than the chroma of the one of the fully saturated secondary colors of the standard printing device and that a difference between the chromas of the one of the fully saturated secondary colors of the user printing device and the standard printing device is not greater than a second predetermined threshold, calculating hue angles of the fully saturated secondary colors of the user printing device, the standard printing device and the target colors from the color values of the one of the fully saturated secondary colors, to compare the hue angles with each other, and on judging that the hue angle of the one of the fully saturated secondary colors of the user printing device is greater than the hue angle of the one of the fully saturated secondary colors of the standard printing device, giving the raster-image processor an instruction to perform the multidimensional color correction while specifying use of the first LUT or the second LUT on a basis of the hue angles, the giving the raster-image processor the instruction on the basis of the hue angles, including instructing the raster-image processor to perform the multidimensional color correction while specifying use of the second LUT, on judging that the hue angle of the one of the fully saturated secondary colors of the target colors has a value which is closer to the hue angle of the one of the fully saturated secondary colors of the user printing device than a mean of the hue angles of the one of the fully saturated secondary colors of the user printing device and the standard printing device, and instructing the raster-image processor to perform the multidimensional color correction while specifying use of the first LUT, on judging that the hue angle of the one of the fully saturated secondary colors of the target colors has a value which is equal to the mean of the hue angles or closer to the hue angle of the one of the fully saturated secondary colors of the standard printing device than the mean of the hue angles.

11. A non-transitory computer-readable storage medium storing a multidimensional color correction program to be executed in a control apparatus for controlling a user printing device equipped with a print engine that forms images by using at least three primary colors which are different in hue from each other, the control apparatus comprising a control unit and a raster-image processor that performs multidimensional color correction and color conversion on image data created from a print job, the multidimensional color correction being a process to correct colors to be output by the user printing device into colors to be output by a predetermined standard printing device, by using a multidimensional LUT (look-up table) which associates input color values of three or more primary colors with corresponding output color values, the color conversion being a process to convert colors to be output by the standard printing device into target colors by using a printer profile for the standard printing device and a target profile, the multidimensional color correction program, when being executed, causing the control unit of the control apparatus to perform processing comprising:

creating the multidimensional LUT including a first LUT and a second LUT, the first LUT including output color values which are indexed by the input color values and are to be obtained by the multidimensional color correction performed on the input color values without a specific process, the specific process being a process to preserve values of complementary color components of secondary colors before and after the multidimensional color correction, the second LUT including output color values which are indexed by the input color values and are to be obtained by the multidimensional color correction performed on the input color values with the specific process;

obtaining color values of fully saturated secondary colors of the user printing device, the standard printing device and the target colors, by referring to the multidimensional LUT, the printer profile for the standard printing device and the target profile;

calculating chromas of the fully saturated secondary colors of the user printing device, the standard printing device and the target colors from the color values obtained, to compare the chromas with each other for each of the fully saturated secondary colors;

on judging that the chroma of one of the fully saturated secondary colors of the user printing device is greater than the chroma of the one of the fully saturated secondary colors of the standard printing device, giving the raster-image processor an instruction to perform the multidimensional color correction while specifying use of the first LUT or the second LUT on a basis of the chromas of the one of the fully saturated secondary colors, the giving the raster-image processor to the instruction on the basis of the chromas, including instructing the raster-image processor to perform the multidimensional color correction while specifying use of the second LUT, on judging that the chroma of the one of the fully saturated secondary colors of the target colors is greater than the chroma of the one of the fully saturated secondary colors of the user printing device, and instructing the raster-image processor to perform the multidimensional color correction while specifying use of the first LUT, on judging that the chroma of the one of the fully saturated secondary colors of the target colors is smaller than the chroma of the one of the fully saturated secondary colors of the standard printing device; and outputting print image data on which the raster-image processor performed the multidimensional color correction and the color conversion, to the print engine and giving the print engine a print instruction.

12. The non-transitory computer-readable storage medium of claim 11, wherein the giving the raster-image processor to the instruction on the basis of the chromas, includes on judging that the chroma of the one of the fully saturated secondary colors of the user printing device is greater than the chroma of the one of the fully saturated secondary colors of the standard printing device, calculating a mean of the chromas of the one of the fully saturated secondary colors of the user printing device and the standard printing device, instructing the raster-image processor to perform the multidimensional color correction while specifying use of the second LUT, on judging that the chroma of the one of the fully saturated secondary colors of the target colors is greater than the mean of the chromas, and instructing the raster-image processor to perform the multidimensional color correction while specifying use of the first LUT, on judging that the chroma of the one of the fully saturated secondary colors of the target colors is not greater than the mean of the chromas.

13. The non-transitory computer-readable storage medium of claim 11, wherein the giving the raster-image processor to the instruction on the basis of the chromas, includes on judging that the chroma of the one of the fully saturated secondary colors of the user printing device is greater than the chroma of the one of the fully saturated secondary colors of the standard printing device, comparing the chroma of the one of the fully saturated secondary colors of target colors with the chromas of the one of the fully saturated secondary colors of the user printing device and the standard device, calculating a ratio of a first difference between the chromas of the one of the fully saturated secondary colors of the target colors and the standard device to a second difference between the chromas of the one of the fully saturated secondary colors of the user printing device and the standard printing device, on judging that the chroma of the one of the fully saturated secondary colors of the target colors is not greater than the chroma of the one of the fully saturated secondary colors of the user printing device and is not smaller than the chroma of the one of the fully saturated secondary colors of the standard printing device, instructing the raster-image processor to perform the multidimensional color correction while specifying use of the first LUT, on judging that the ratio is smaller than a predetermined threshold value, and instructing the raster-image processor to perform the multidimensional color correction while specifying use of the second LUT, on judging that the ratio is not smaller than the predetermined threshold value.

14. The non-transitory computer-readable storage medium of claim 11, wherein the giving the raster-image processor to the instruction on the basis of the chromas, includes on judging that the chroma of the one of the fully saturated secondary colors of the user printing device is greater than the chroma of the one of the fully saturated secondary colors of the standard printing device, comparing the chroma of the one of the fully saturated secondary colors of target colors with the chromas of the one of the fully saturated secondary colors of the user printing device and the standard device, and prompting a user to choose whether to cause the raster-image processor to perform the multidimensional color correction without the specific process by using the first LUT or to perform the multidimensional color correction with the specific process by using the second LUT, on judging that the chroma of the one of the fully saturated secondary colors of the target colors is not greater than the chroma of the one of the fully saturated secondary colors of the user printing device and is not smaller than the chroma of the one of the fully saturated secondary colors of the standard printing device.

15. The non-transitory computer-readable storage medium of claim 11, wherein the giving the raster-image processor to the instruction on the basis of the chromas, includes on judging that the chroma of the one of the fully saturated secondary colors of the user printing device is greater than the chroma of the one of the fully saturated secondary colors of the standard printing device and that a difference between the chromas of the one of the fully saturated secondary colors of the user printing device and the standard printing device is not greater than a second predetermined threshold, calculating hue angles of the fully saturated secondary colors of the user printing device, the standard printing device and the target colors from the color values of the one of the fully saturated secondary colors, to compare the hue angles with each other, and on judging that the hue angle of the one of the fully saturated secondary colors of the user printing device is greater than the hue angle of the one of the fully saturated secondary colors of the standard printing device, giving the raster-image processor an instruction to perform the multidimensional color correction while specifying use of the first LUT or the second LUT on a basis of the hue angles, the giving the raster-image processor the instruction on the basis of the hue angles, including instructing the raster-image processor to perform the multidimensional color correction while specifying use of the second LUT, on judging that the hue angle of the one of the fully saturated secondary colors of the target colors has a value which is closer to the hue angle of the one of the fully saturated secondary colors of the user printing device than a mean of the hue angles of the one of the fully saturated secondary colors of the user printing device and the standard printing device, and instructing the raster-image processor to perform the multidimensional color correction while specifying use of the first LUT, on judging that the hue angle of the one of the fully saturated secondary colors of the target colors has a value which is equal to the mean of the hue angles or closer to the hue angle of the one of the fully saturated secondary colors of the standard printing device than the mean of the hue angles.

* * * * *